United States Patent
Nishioka

(10) Patent No.: US 6,741,433 B1
(45) Date of Patent: May 25, 2004

(54) MAGNETO-RESISTIVE HEAD AND MAGNETIC TUNNEL JUNCTION MAGNETO-RESISTIVE HEAD HAVING PLURAL FERROMAGNETIC LAYERS AND AN ANITFERROMAGNETICALLY COUPLING LAYER

(75) Inventor: Koichi Nishioka, Hiratsuka (JP)

(73) Assignee: Hitachi Global Storage Technologies Japan, Ltd., Tokyo (JP)

( * ) Notice: Subject to any disclaimer, the term of this patent is extended or adjusted under 35 U.S.C. 154(b) by 517 days.

(21) Appl. No.: 09/666,885

(22) Filed: Sep. 20, 2000

(30) Foreign Application Priority Data

Jun. 30, 2000 (JP) ........................................ 2000-203059

(51) Int. Cl.[7] ................................................ G11B 5/39
(52) U.S. Cl. ................................ 360/324.2; 360/327.32
(58) Field of Search ........................... 360/324.2, 327.32

(56) References Cited

U.S. PATENT DOCUMENTS

| | | | | |
|---|---|---|---|---|
| 5,668,687 A | * | 9/1997 | Chen et al. | 360/327.32 |
| 6,114,719 A | * | 9/2000 | Dill et al. | 257/295 |
| 6,266,218 B1 | * | 7/2001 | Carey et al. | 360/324.12 |
| 6,452,385 B1 | * | 9/2002 | Shimazawa et al. | 324/252 |

FOREIGN PATENT DOCUMENTS

| | | |
|---|---|---|
| JP | 10-162327 | 6/1998 |
| JP | 10-255231 | 9/1998 |

* cited by examiner

*Primary Examiner*—A. J. Heinz
(74) *Attorney, Agent, or Firm*—Mattingly, Stanger & Malur, P.C.

(57) ABSTRACT

As to a magnetic tunnel junction magneto-resistive head, which comprises an antiferromagnetically coupling layer, a pinned ferromagnetic layer adjacent to said antiferromagnetically coupling layer and magnetically pinned by a magnetization of said antiferromagnetically coupling layer, a free ferromagnetic layer which is magnetically free from the magnetization of said antiferromagnetically coupling layer, insulating layers sandwiched by these ferromagnetic layers, a stacked layers of ferromagnetic layers to control the magnetic domain of said free ferromagnetic layer and a pair of electrodes to apply a current to these layers and films, said stacked layers of ferromagnetic layers are formed between said free ferromagnetic layer and one of said electrodes. According to this composition, it is possible to present a magnetic tunnel junction magneto-resistive sensor with preferable domain controlling force against the free ferromagnetic layer.

24 Claims, 11 Drawing Sheets

(a)

(b)

MAGNETO-RESISTIVE HEAD AND MAGNETIC TUNNEL JUNCTION MAGNETO-RESISTIVE HEAD HAVING PLURAL FERROMAGNETIC LAYERS AND AN ANITFERROMAGNETICALLY COUPLING LAYER

BACKGROUND OF THE INVENTION

The present invention relates to a magnetic tunnel junction magneto-resistive head using a magneto-resistive (MR) sensor based on magnetic tunnel junction effect as a read sensor and its manufacturing method.

In accordance with increasing high density of a magnetic storage apparatus in recent years, a spin valve type magneto-resistive sensor, which uses giant magneto-resistive (GMR) effect, is put to practical use for a read sensor. Further, in order to realize future high density, it is popular to develop a magneto-resistive sensor based on tunneling magneto-resistive (TMR) effect.

The magnetic tunnel junction effect is the phenomenon that in case of the forming of a junction where an insulating junction layer lies between two ferromagnetic layers, its junction resistance depends on the angle between the magnetization directions of two ferromagnetic layers. The phenomenon exhibits that the junction resistance becomes the minimum when the magnetization directions of two ferromagnetic layers are in parallel, the junction resistance becomes the maximum when they are in anti-parallel each other, and the junction resistance becomes medium between the minimum and the maximum when they are in medium between parallel and anti-parallel directions. Hereafter, such the stack of the layers is defined as Magnetic Tunneling Junction Stack that exhibits this kind of phenomenon and comprises two ferromagnetic layers and an insulating junction layer (insulating tunnel barrier layer) laid between them.

The Magnetic Tunneling Junction Stack is formed on a lower electrode on a substrate which is a stacked structure with plural layers and contacted with an upper electrode. An electric current is input to either of the lower electrode or the upper electrode and is returned to the other electrode through the Magnetic Tunneling Junction Stack. Magnetically recorded information is read out by detecting a voltage signal between the two electrodes.

First ferromagnetic layer composing the Magnetic Tunneling Junction Stack, which is called as a pinned ferromagnetic layer, has an antiferromagnetically coupling layer on the opposite side to the junction layer, and its magnetic moment is prevented from spinning under the magnetic field applied within the range of desired amount by an exchange coupling bias field of the antiferromagnetically coupling layer. And the second ferromagnetic layer, which is called as a free ferromagnetic layer, does not have an antiferromagnetically coupling layer on the opposite side of the junction layer, and its magnetic moment is free to spin under the magnetic field applied within the range of desired amount. The magnetic moment of the pinned ferromagnetic layer is positioned toward the direction to cross an air-bearing surface approximately at right angles. Besides, from the point of view of a good read signal, the free ferromagnetic layer is preferred to be a single magnetic domain and the magnetic moment is preferred to be in parallel to the air-bearing surface when no magnetic field is given.

As an example of prior art, a structural drawing of a view from an air-bearing surface of the structure disclosed by JP-B-10-162327 is shown in FIG. 6.

The magnetic tunnel junction magneto-resistive read head in FIG. 6 has a Magnetic Tunneling Junction Stack unit 300 which is formed as a stack between a lower electrode 102 formed on a substrate of a gap layer G1 and an upper electrode 104 formed under a gap layer G2. The Magnetic Tunneling Junction Stack unit 300 comprises a pin layer 310, an insulating tunnel barrier layer 320, a free ferromagnetic layer 330 and a protective layer 360.

The pin layer 310 formed so as to contact the lower electrode 102 has a seed layer 312 on the lower electrode 102, a layer of an antiferromagnetic material on the seed layer 312 and a 'pinned' ferromagnetic layer, which is formed on the antiferromagnetically coupling layer 316 and exchange biased. This 'pinned' ferromagnetic layer is named as a pinned ferromagnetic layer 319 since its magnetic moment is prevented from spinning under the magnetic field applied within the range of desired amount. The magnetic moment of this pinned ferromagnetic layer 319 is positioned toward the direction to cross the air-bearing surface approximately at right angles.

According to the prior art, a hard magnetic material 350 is arranged on both sides of the Magnetic Tunneling Junction Stack in view from the air-bearing surface and the magnetic moment of the free ferromagnetic layer is controlled to be the desired direction by the magneto-static coupling with the free ferromagnetic layer 330 in order to make the free ferromagnetic layer 330 to be a single domain structure and to set its magnetized direction to be in parallel to the air-bearing surface. Because of using a conductive material as a hard magnetic material such as CoPtCr, there exists a bypassed current which does not go through the tunnel junction if the Magnetic Tunneling Junction Stack is contacted directly with the hard magnetic material, so that such the current is useless to a resistance variation and makes the sensitivity of a sensor decrease. Therefore, an insulating layer 370 of $Al_2O_3$ or $SiO_2$ is applied between these layers to prevent from a electric contact between the hard magnetic material layer and the Magnetic Tunneling Junction Stack.

As another example of the prior art, there is JP-B-10-255231. According to this example, as well as the described prior art, a hard magnetic material layer or an antiferromagnetically coupling layer is arranged on both sides of a free ferromagnetic layer. However, the size of a pinned ferromagnetic layer is formed to be smaller than the free ferromagnetic layer.

In case of the magnetic tunnel junction magneto-resistive head of Abutted junction type as disclosed by JP-B-10-162327, the hard magnetic material 350 is arranged on each of both sides of the Magnetic Tunneling Junction Stack through the inserted insulating layer 370. If the insulating layer becomes thicker, the distance between the hard magnetic material layer 350 and the free ferromagnetic layer 330 becomes longer, so that the magneto-static coupling becomes less, the domain controlling force to the free ferromagnetic layer 330 becomes weaker, and then Barkhousen noise appears in the read signal waveform. On the other hand, if the distance between the hard magnetic material layer 350 and the free ferromagnetic layer 330 becomes closer, the domain controlling force to the free ferromagnetic layer 330 becomes stronger. However, the insulation breakdown voltage between the hard magnetic material layer and the Magnetic Tunneling Junction Stack becomes lower, so that there increases the possibility not to achieve the expected performance because of the insulation breakdown during the manufacturing process or the practical use.

Therefore, according to the construction shown by JP-B-10-162327, there is a problem that it is difficult to realize the magnetic moment control of the free ferromagnetic layer in conjunction with keeping enough insulation between the hard magnetic material layer and the Magnetic Tunneling Junction Stack.

In addition in case that the pinned ferromagnetic layer is formed smaller than the free ferromagnetic layer and the hard magnetic material is arranged on both sides of the free ferromagnetic layer as shown in JP-B-10-255231, it is possible to overcome the problem of the bypassed current through the hard magnetic material layer, however, it is practically difficult to form the pinned ferromagnetic layer as smaller than the free ferromagnetic layer since so highly difficult process technique is required that it is necessary to etch selectively the pinned ferromagnetic layer without etching of the free ferromagnetic layer from a body formed as a stack of the pinned ferromagnetic layer and the free ferromagnetic layer.

SUMMARY OF THE INVENTION

The object of the present invention is to present a magnetic tunnel junction magneto-resistive head and its manufacturing method to realize the magnetic moment control of the free ferromagnetic layer with less harmful risk that is difficult according to the prior arts.

The first structure of the Magnetic Tunneling Junction Stack comprises;

an antiferromagnetically coupling layer, a pinned ferromagnetic layer which is contacted with said antiferromagnetically coupling layer and exchange biased with said antiferromagnetically coupling layer to prevent the magnetic moment from spinning under an applied magnetic field, an insulating tunnel barrier layer which is contacted with said pinned ferromagnetic layer, a free ferromagnetic layer for detection which is contacted with said insulating tunnel barrier layer and which magnetic moment is free to spin under applied magnetic field, a nonmagnetic conductive layer which is contacted with said free ferromagnetic layer, and a domain controlling layer which is contacted with said nonmagnetic conductive layer.

Said domain controlling layer has two ferromagnetic layers and an antiferromagnetically coupling film which is placed between said ferromagnetic layers to make the magnetic moment of said adjacent ferromagnetic layers be coupled antiferromagnetically. The magnetic moment of the pinned ferromagnetic layer is put toward the direction to cross an air-bearing surface at right angles, and the magnetic moment of the ferromagnetic layers of the domain controlling layer are put toward the direction in parallel to the air-bearing surface. Cobalt, an alloy of cobalt and iron as its main components, an alloy of cobalt, iron and vanadium as its main components or an alloy of cobalt, nickel and copper as its main components is used for the ferromagnetic material to compose the domain controlling layer.

And the second structure of the Magnetic Tunneling Junction Stack comprises;

a domain controlling layer, a nonmagnetic conductive layer which is contacted with said domain controlling layer, first antiferromagnetically coupling layer which is contacted with said nonmagnetic conductive layer, a pinned ferromagnetic layer which is contacted with said first antiferromagnetically coupling layer and exchange biased with said first antiferromagnetically coupling layer to prevent the magnetic moment from spinning under an applied magnetic field, an insulating tunnel barrier layer which is contacted with said pinned ferromagnetic layer, and a free ferromagnetic layer for detection which is contacted with said insulating tunnel barrier layer and which magnetic moment is free to spin under applied magnetic field.

Said domain controlling layer has two ferromagnetic layers and an antiferromagnetically coupling film which is placed between said ferromagnetic layers to make the magnetic moment of said adjacent ferromagnetic layers be coupled antiferromagnetically. The magnetic moment of the pinned ferromagnetic layer is put toward the direction to cross an air-bearing surface at right angles, and the magnetic moment of the ferromagnetic layers of the domain controlling layer are put toward the direction in parallel to the air-bearing surface. Cobalt, an alloy of cobalt and iron as its main components, an alloy of cobalt, iron and vanadium as its main components or an alloy of cobalt, nickel and copper as its main components is used for the ferromagnetic material to compose the domain controlling layer.

And the third structure of the Magnetic Tunneling Junction Stack comprises;

first antiferromagnetically coupling layer, a pinned ferromagnetic layer which is exchange biased with said first antiferromagnetically coupling layer, an insulating tunnel barrier layer which is contacted with said pinned ferromagnetic layer, a free ferromagnetic layer which is contacted with said insulating tunnel barrier layer, a nonmagnetic conductive layer which is contacted with said free ferromagnetic layer, and a domain controlling layer which is contacted with said nonmagnetic conductive layer.

Said domain controlling layer has two ferromagnetic layers, an antiferromagnetically coupling film which is placed between said ferromagnetic layers to make the magnetic moment of said ferromagnetic layers be coupled antiferromagnetically, and second antiferromagnetically coupling layer adjacent to the above ferromagnetic layer. The magnetic moment of the pinned ferromagnetic layer is put toward the direction to cross an air-bearing surface at right angles, and the magnetic moments of the ferromagnetic layers of the domain controlling layer are put toward the direction in parallel to the air-bearing surface. A soft magnetic alloy such as NiFe alloy, CoFe alloy or NiFeCo alloy is used as the ferromagnetic material of the domain controlling layer. First antiferromagnetically coupling layer and second antiferromagnetically coupling layer use different materials each other in terms of blacking temperature. The blocking temperature of the first antiferromagnetically coupling layer is to be higher than the blocking temperature of the second antiferromagnetically coupling layer. For this purpose, the first antiferromagnetically coupling layer uses a regular alloy such as PtMn, NiMn, PdMn or PdPtMn alloy, etc. The second antiferromagnetically coupling layer uses an irregular alloy such as IrMn, FeMn, RhRuMn, CrMnPt alloy, etc. And a single ferromagnetic layer can be used for the domain controlling layer instead of two ferromagnetic layers and an antiferromagnetically coupling film placed between said ferromagnetic layers as its components.

Two kinds of domain controlling forces work to the free ferromagnetic layer for first structure of the Magnetic Tunneling Junction Stack. One is (1) that the magnetic poles, which are induced on the edges of the ferromagnetic layers constituting the domain controlling layer, give biasing magnetic field in parallel to the air-bearing surface to the free ferromagnetic layer by interacting magneto-statically with the edges of the free ferromagnetic layer. The other is (2) that the ferromagnetic layer of the domain controlling layer adjacent to the nonmagnetic conductive layer gives biasing magnetic field in parallel to they air-bearing surface to the free ferromagnetic layer by RKKY interaction or Orange-Peel interaction. Cobalt, alloy of cobalt and iron as its main components, alloy of cobalt, iron and vanadium as its main components or an alloy film of cobalt, nickel and copper as its main components is used for the ferromagnetic layer constituting the domain controlling layer, because the magnetic dispersion is made smaller and the free ferromagnetic layer is not to be prevented from magnetically spinning freely. The reason why the stacked construction where the antiferromagnetically coupling film lies between said ferromagnetic layers is used for the domain controlling layer is because the ferromagnetic layer of small dispersion is not so large in terms of anisotropy field, so the magnetic moment is not stabilized enough.

Second structure of the Magnetic Tunneling Junction Stack is constituted by the magnetic domain controlling layer where the antiferromagnetically coupling film lies between two ferromagnetic layers as same as the first structure of the Magnetic Tunneling Junction Stack except its different composition order.

In case of third structure of the Magnetic Tunneling Junction Stack, the domain controlling layer comprises the second antiferromagnetically coupling layer adjacent to the ferromagnetic layer. This is the purpose to stabilize the magnetic moment of the domain controlling layer by the second antiferromagnetically coupling layer applying biasing magnetic field to the ferromagnetic layer. The reason why the ferromagnetic layer constituting the domain controlling layer uses such a soft magnetic alloy as NiFe alloy, Co. CoFe alloy or NiFeCo alloy, etc. is to prevent negative influence to the free ferromagnetic layer since the dispersion of magnetization is small. And the reason why the blocking temperature of the first antiferromagnetically coupling layer is set to be higher than the blocking temperature of the second antiferromagnetically coupling layer is to make difference the direction of the biasing magnetic field applied to the pinned ferromagnetic layer by the first antiferromagnetically coupling layer from the direction (i.e., crossing at right angles) of the biasing magnetic field applied to the ferromagnetic layer constituting the domain controlling layer, by the second antiferromagnetically coupling layer. The first antiferromagnetically coupling layer uses such a regular alloy as PtMn, NiMn, PdMn or PdPtMn alloy, etc., and the second antiferromagnetically coupling layer uses such an irregular alloy as JrMn, FeMn, RhRuMn or CrMnPt alloy, etc. It is because the former gives higher blocking temperature, and the latter gives lower blocking temperature than the earlier.

According to the Magnetic Tunneling Junction Stack of the present invention, the plural layers placed between the upper and lower electrodes can be formed continuously in a same vacuum chamber, so that the manufacturing process can be simplified comparing to the Abutted junction type head where permanent magnets, which are sandwiched by insulating layers, are arranged at the sides of the Magnetic Tunneling Junction Stack.

DESCRIPTION OF THE PREFERRED EMBODIMENT

The present invention can be widely applied to the detection of an external magnetic field, and particularly it is useful for a read head of a system for magnetically recording and reading information, where the information is recorded as an arrangement of magnetic domains on a magnetic media. Any kind of magnetic media can be used such as a magnetic tape, a magnetic drum, one or plural hard disk(s) or one or plural flexible disk, etc. for instance. The magnetic domains are usually aligned along to a track, which structure is a ring type, an eddy type, a spiral type or a variable length type.

Figure 1:
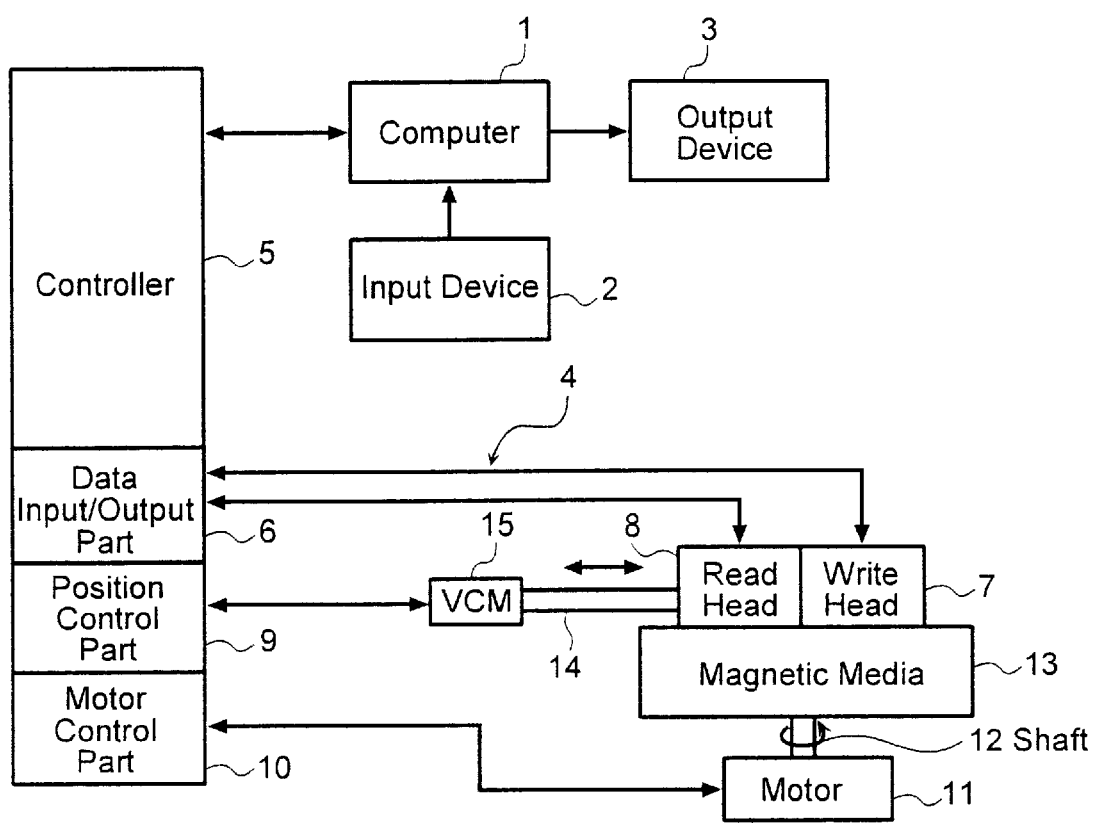
FIG. 1 shows the outline of an example of an information recording and reading apparatus where the present invention is applied.

A Typical information recording and reading apparatus being applied by the present invention is shown in FIG. 1 as an example. A computer 1 receives input information from one or plural of such an input device 2 as a network, a keyboard, a scanner or an equivalent device through the interface between the computer and the input device(s). The computer 1, in addition to connecting one or plural input device(s), can output to one or plural output device(s). This output device 3 may be a network, a printer, a display device or a modem, etc. connected to the computer through the interface. As well as other recording devices related to the computer 1, the computer writes information into a magnetic storage apparatus 4 which is a peripheral device or reads information from a magnetic storage apparatus. The magnetic storage apparatus comprises the following internal devices.

(1) Controller 5: This includes an data I/O part 6 which outputs information signal to a recording head 7, inputs information from a read head 8 and receives a feedback signal from the head.

(2) Position control part 9: This outputs a head position control signal and inputs a head position detection signal.

(3) Motor control part 10: This controls the operations such as speed, stopping, starting as related to relative motion of a magnetic media against a head. In the present preferred embodiment, it outputs the rotation control signal to the motor 11 which drives one or plural disk type magnetic media 13 to rotate by its shaft 12. A transducer comprising an independent recording head 7 and an independent reading head 8 is usually moved along to the radial direction of the disk by a support arm 14 and a voice-coil motor (VCM) 15 so as to be slightly contacting with the magnetic media (disk) 13 or to be flying over the media by keeping a narrow distance.

As described above, the information recording and reading apparatus shown in FIG. 1 is still a typical example only. Since the operation of the apparatus shown in FIG. 1 is self-evident, the detail explanation is omitted here.

Figure 2:
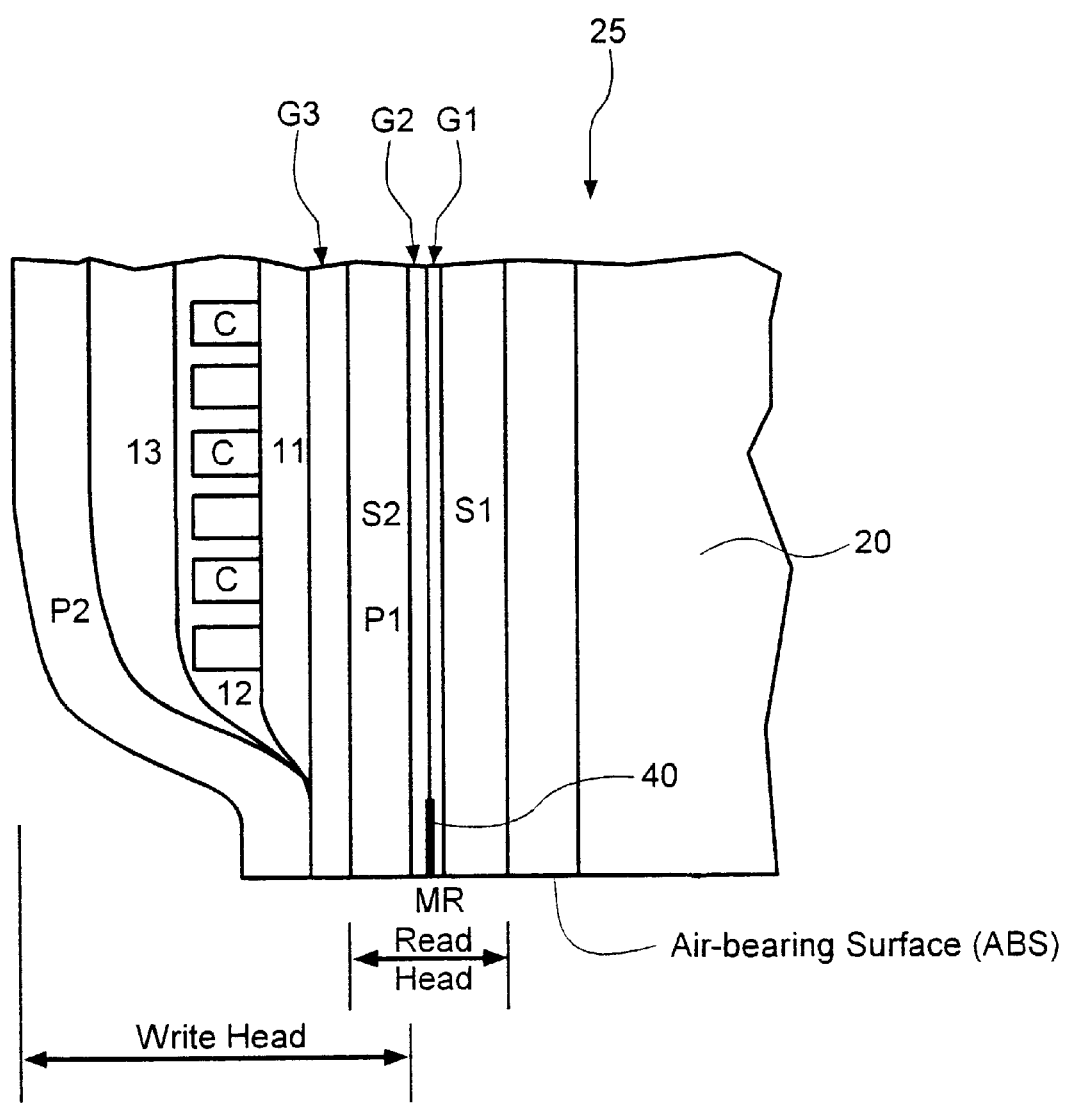
FIG. 2 is a vertical sectional view of a composite head which comprises MR read head adjacent to the recording head.

The structure of a composite magnetic head comprising a recording head part and a MR read head part for reading is explained by referring to FIG. 2 of the vertical cross sectional view. The head is finished by polish lapping to form an air-baring surface (ABS), so that the ABS keeps a distance from the surface of the magnetic media 13 (in FIG. 1) by the air-bearing effect. The read head comprises a MR sensor 40 lies between first gap layer G1 and second gap layer G2, those first and second gap layers G1 and G2 are also sandwiched between first shield layer S1 and second shield layer S2. In case of a disk drive of the prior art, the MR sensor 40 is a spin valve sensor. The recording head comprises a coil layer C and an insulating layer I2, and they lie between insulating layers I1 and I3. The insulating layers I1 and I3 are also sandwiched between first magnetic pole piece P1 and second magnetic pole piece P2. Third gap G3 lies between the electrode top edges of the first magnetic pole piece P1 and the second magnetic pole piece P2 adjacent to the ABS surfaces to form a magnetic gap. At recording, a signal current runs through the coil layer C and the magnetic flux is leaked on the air-bearing surface. This magnetic flux magnetizes a circular track on a magnetic media during recording operation. While reading, the magnetized segment on the rotating magnetic media gives magnetic flux to the MR sensor 40 of the read head to make resistance variation inside of the MR sensor. This resistance variation is detected by detecting the voltage variation across the MR sensor 40. The recording and reading composite head 25 is a shared head, which uses the second shield S2 for reading as the first magnetic pole piece P1 for recording also. In case of a piggyback head (not shown), the second shield and for the first magnetic pole piece P1 are separated layers each other.

The description about the usual magnetic disk drive with a MR reading head above and FIG. 1 and FIG. 2 is objected to explain the present invention for the understanding.

First Preferred Embodiment

The present invention relates to a construction of a read head 8 in FIG. 1, and relates to a magnetic tunnel junction head for reading, which uses a MR sensor based on magnetic tunnel junction effect instead of the MR sensor 40 of a composite head shown in FIG. 2.

Figure 3:
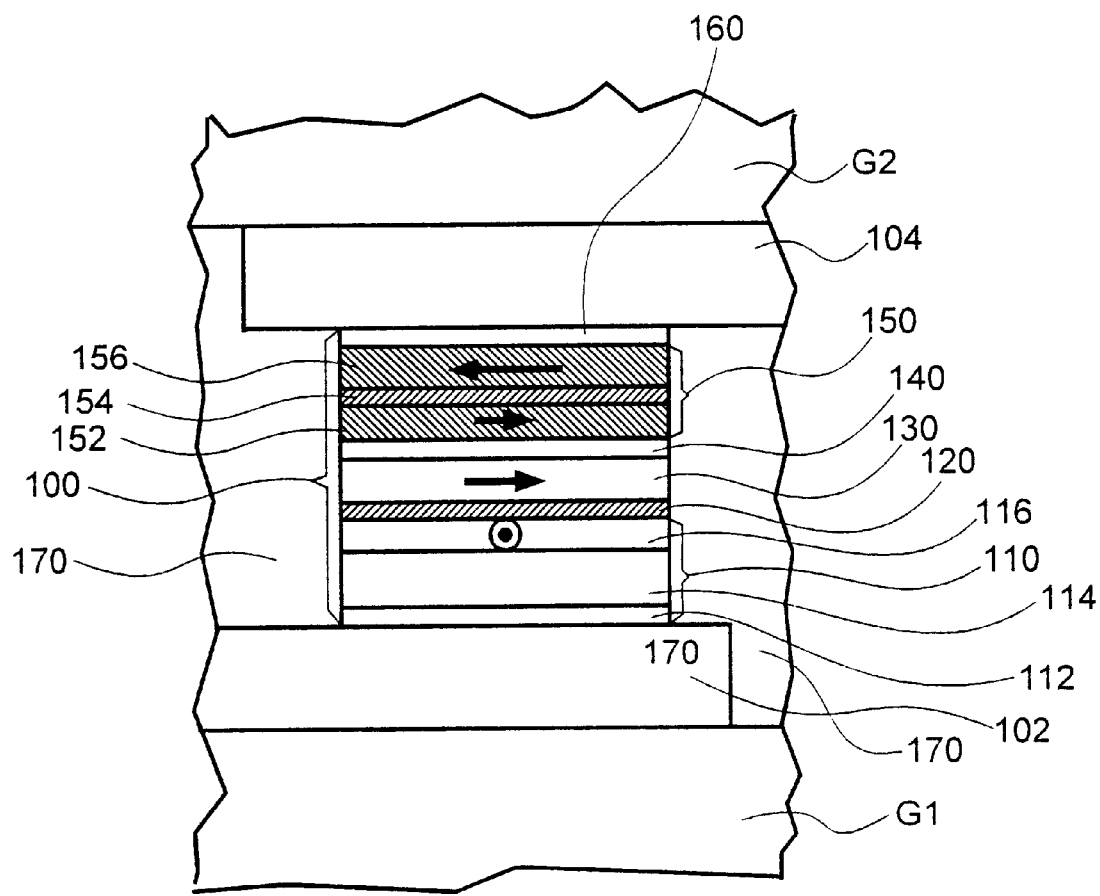
FIG. 3 is a sectional view of a magnetic tunnel junction MR read head according to the first preferred embodiment of the present invention.

The magnetic tunnel junction MR read head in FIG. 3 comprises a Magnetic Tunneling Junction Stack 100 which is formed as a layer between a lower electrode 102 formed on a gap layer G1 substrate and an upper electrode 104 under a gap layer G2. The lower electrode 102 may be also used as the first shield S1 for the common use. The upper electrode 104 may be also used as the second shield S2 as well.

The Magnetic Tunneling Junction Stack 100 comprises a pin layer 110, an insulating tunnel barrier layer 120, a free ferromagnetic layer 130, a nonmagnetic conductive layer 140, a domain controlling layer 150 and a protective layer 160.

The pin layer 110 formed adjacent to the lower electrode 102 has a seed layer 112 on the lower electrode 102, a layer of an antiferromagnetic material on the seed layer, and a pinned ferromagnetic layer which is formed on the antiferromagnetically coupling layer 114 and is exchange biased. This 'pinned' ferromagnetic layer is named a pinned ferromagnetic layer 116 since the magnetic moment is prevented from spinning under the applied magnetic field within the range of desired amount. The direction of the magnetic moment of the pinned ferromagnetic layer 116 is set to cross the air-bearing surface approximately at right angles, in other words, it crosses the plane of the paper at right angles as shown by the arrow head in FIG. 3.

This stacked construction is formed as layers, by Sputtering method using argon gas for instance, in a same vacuum chamber to prevent each layer from being exposed to the atmosphere during a shift from one forming to another. The insulating tunnel barrier layer is also formed in the same vacuum chamber as well, not to expose to the atmosphere from the beginning of the forming through the end.

The seed layer 112 can use a 1 to 7 nm thick single layer of Ta, laminated layers of 1 to 7 nm thick Ta and 1 to 5 nm thick NiFe, laminated layers of 1 to 7 nm thick Ta and 1 to 7 nm thick NiFeCr or laminated layers of 1 to 7 nm thick Ta and 1 to 7 nm thick NiCr, where the first element in these alloys are formed adjacent to the lower electrode. The thickness of these layers are optimized to control the crystallographic orientation of the antiferromagnetically coupling layer 114 formed on them and to keep enough value of the exchange biasing field with the pinned ferromagnetic layer.

As to the antiferromagnetically coupling layer 114, it call use an alloy layer of 7 to 20 nm thick PtMn, an alloy layer of 10 to 30 nm thick NiMn or PdPtMn or an alloy layer of 5 to 13 nm thick IrMn. It is preferred to use an alloy layer of 7 to 20 nm thick PtMn for the purpose of thermal stability of pinning force of the pinned ferromagnetic layer, an electric conductivity life and the view point that thinner thickness of the layer is more desirable.

And as to the pinned ferromagnetic layer 116, it can use a layer of 1 to 3 nm thick Co or an alloy layer of 1 to 3 run thick CoFe. Or as for a stacked type of layers, it can use layers of 1 to 5 nm thick Co, 0.6 to 1.0 nm thick Ru and 1 to 5 nm thick Co or layers of 1 to 5 nm CoFe, 0.6 to 1.0 nm thick Ru and 1 to 5 nm thick CoFe. In case of the stacked type of layers, this thickness of the Ru layer is selected so as to force each magnetic moment of the adjacent two ferromagnetic layers to be set to opposite direction to each other. A magnetic pole of the edge part of the pinned ferromagnetic layer makes the magnetized direction of the free ferromagnetic layer 130 tilt against the parallel direction of the air-bearing surface, that degrades symmetric characteristic of a read out signal, so that the amount of magnetic pole of the edge part of the pinned ferromagnetic layer 116 is preferred to be small as possible. Therefore, the pinned ferromagnetic layer is to be a stacked type of layers and each magnetic moment of two ferromagnetic layers is expected to be the same amount each other by adjusting the thickness. When a same material is used for the ferromagnetic layers, the difference of the thickness between both ferromagnetic layers is preferred no more than 5 nm.

The insulating tunnel barrier layer 120 is an aluminum oxide film, and its thickness is preferred to be 0.5 to 2 nm. The forming method is that aluminum is sputtered, then oxidized within oxygen atmosphere or within oxygen radical.

The free ferromagnetic layer 130 is of a ferromagnetic material, and the magnetic moment is free to spin under applied magnetic field within the range of desired amount. The free ferromagnetic layer 130 can use layers of 0.5 to 2 nm thick CoFe and 1 to 7 nm thick NiFe, layers of 0.5 to 2 nm thick Co and 1 to 7 nm NiFe, a 1 to 3 nm thick CoNiFe layer or a 1 to 3 nm thick CoNiFe layer by attaching Co or CoFe onto the insulating tunnel barrier layer 140. The reason why Co or CoFe is attached onto the insulating tunnel barrier layer is to make the resistance variation large.

The magnetic moment of the free ferromagnetic layer 130 is preferred to be in parallel to the air-bearing surface. For this purpose, the nonmagnetic conductive layer 140 is placed adjacently on the free ferromagnetic layer 130 and the domain controlling layer 150 is placed adjacent to the nonmagnetic conductive layer 140. The nonmagnetic conductive layer 140 is to be conductive in order to make magnetic coupling force between the free ferromagnetic layer 130 and the domain controlling layer 150 be reasonably weak, not to prevent the magnetic moment of the free ferromagnetic layer 130 from spinning freely, and to feed a current to the tunnel barrier layer. The material composing the nonmagnetic conductive layer 140 is preferred to use Cu, Au, Ag or an alloy layer of these materials, and the thickness is preferred to be 1.8 to 3.5 nm. The minimum limit of the thickness is decided so as to keep the coupling force between the domain controlling layer and the free ferromagnetic layer weak enough not to prevent the free ferromagnetic layer from spinning freely. The maximum limit of the thickness is also decided so that the domain controlling layer gives reasonable amount of magnetic bias field to the free ferromagnetic layer through the nonmagnetic conductive layer to control its domain to make it be a single domain.

The domain controlling layer comprises the ferromagnetic layer 152, the antiferromagnetically coupling film 154 adjacent to the ferromagnetic layer 152, and the ferromagnetic layer 156 adjacent to the antiferromagnetically coupling film 154. The antiferromagnetically coupling film 154 works to couple antiferromagnetically the magnetic moments of adjacent two ferromagnetic layers 152 and 156 each other, and each magnetic moment is arranged in anti-parallel each other as shown by the arrows in 152 and 156 in FIG. 3. This composition performs the domain controlling of the free ferromagnetic layer according to the following two magnetic interactions below. One is (1) that the magnetic poles, induced on the edge part of the ferromagnetic layers, give biasing magnetic field to the free ferromagnetic layer in parallel to the air-bearing surface, by interacting magneto-statically with the edge part of the free ferromagnetic layer, so that it makes the free ferromagnetic layer be a single domain structure. The other is (2) that the ferromagnetic layer of the domain controlling layer's side, adjacent to the nonmagnetic conductive layer, gives biasing magnetic field in parallel to the air-bearing surface, by RKKY interaction or Orange-Peel interaction, so that it makes the free ferromagnetic layer be a single domain structure.

The effect (1) makes a difference of the amount of the magnetic moment between two ferromagnetic layers 152 and 156. In other words, it is possible to control the magnetic biasing field applied to the free ferromagnetic layer by changing the difference of the thickness of the layers. The direction the magnetic biasing field given to the free ferromagnetic layer in FIG. 3 is from the right to the left when the magnetic moment of 156 is larger than the magnetic moment of 152, and is from the left to the right when the magnetic moment of 156 is smaller than the magnetic moment of 152. The effect (2) is that it is possible to control the magnetic biasing field applied to the free ferromagnetic layer by changing the thickness of the nonmagnetic conductive layer. The direction is usually in parallel to the arrow of the magnetic moment of 152, which is from the right to the left in the free ferromagnetic layer in FIG. 3. Therefore in order to prevent the effects of (1) and (2) from being cancelled, the magnetic moment of the ferromagnetic layer 152 on the free ferromagnetic layer's side among two ferromagnetic layers, is preferred to be smaller than the magnetic moment of the other ferromagnetic layer 156. When a same material is used for both ferromagnetic layers, it is preferred that the thickness of the ferromagnetic layer 152 on the free ferromagnetic layer's side is thinner than the thickness of the other ferromagnetic layer 156.

The domain controlling layer 150 is preferred to use the material which does not create a magnetic pole within the layer surface and not prevent the free ferromagnetic layer from spinning freely. And it is also necessary that the magnetic moment does not spin under the external magnetic field applied by desired amount. In order to prevent the magnetic moment from spinning, the anisotropy field (or coercivity) needs to be large. It may be considered to use a permanent magnet material when the anisotropy field is to be enlarged by using the ferromagnetic layer of a single layer as the domain controlling layer 150. However, the permanent magnet material is not appropriate for the domain controlling layer since the magnetic dispersion of the permanent magnet is so large that there induces a magnetic pole within the layer surface to make the coercivity of the free ferromagnetic layer be large and to prevent its free magnetic spinning. On the contrary, when there uses the ferromagnetic layer of small magnetic dispersion in order not to prevent magnetic spinning of the free ferromagnetic layer, there is a problem that it easily spins under the external magnetic field since the ferromagnetic layer of small magnetic dispersion has a small coercivity, so that it is inappropriate for the domain controlling layer again.

Therefore, in order to solve the problem, the domain controlling layer uses a stacked layer type construction in the present invention. The stacked layer construction comprises at least two ferromagnetic layers and an antiferromagnetically coupling layer which is sandwiched by these ferromagnetic layers and makes the magnetic moment of said ferromagnetic layers be coupled in anti-parallel direction each other, where these ferromagnetic layers are strongly antiferromagnetically coupled each other and pretend as a single magnetic unit under the desired external magnetic field. The total magnetic moment of the stacked layer construction described above seems to be smaller since two magnetic moments are arranged in anti-parallel each other. Therefore, the torque, which tends to spin said stacked layer construction under external magnetic field, becomes smaller, so that it becomes difficult to be spun magnetically by external magnetic field. That is, the effective anisotropy field (or effective coercivity) becomes large by taking said stacked layer construction above. The smaller the difference of the magnetic moment between both ferromagnetic layers of said stacked layer construction is, the larger the effective anisotropy field (or the effective coercivity) becomes. However, it is necessary to adjust the difference since the amount of the magnetic poles induced on the edges of said stacked layer construction becomes less due to the cancellation. It is preferred that the ferromagnetic material used for said stacked layer construction is the material of smaller magnetic dispersion, in other words larger squareness ratio of Hysteresis curve, since the magnetic pole is not induced within the layer surface. In addition, large anisotropy field (or coercivity) is also preferable. As to the concrete material, it is preferred that the anisotropy field or the coercivity is not less than 4000 A/m and the squareness ratio of Hysteresis curve is not less than 0.95. The more concrete material can be an alloy layer of cobalt and iron (coercivity: 4000 A/m approx.), an alloy layer of cobalt, iron and vanadium (coercivity: 8000 to 16000 A/m), or an alloy layer of cobalt, nickel and copper (coercivity: 16000 to 48000 A/m). And as the antiferromagnetically coupling field between both ferromagnetic layers of said stacked layer construction becomes stronger, the ferrimagnetic stack unit behaves as a single body even in a strong external magnetic field, so that it becomes difficult to spin under external magnetic field Therefore, the antiferromagnetically coupling field is preferred to be larger, more concretely, it is needed at least no less than 80 kA/m, more preferably no less than 160 kA/m. As the material, Ru, Ir or Rh can be used, which induces antiferromagnetically coupling as the thickness is not more than 1.0 nm, so the preferable thickness is between 0.5 and 1.0 nm. And also, the antiferromagnetically coupling field is related to the thickness of the ferromagnetic layer composing the domain controlling layer, and the thickness of both ferromagnetic layers is preferred to be no larger than 6 nm in order to make the antiferromagnetically coupling field be large enough.

While the domain controlling layer is composed by two ferromagnetic layers and a single antiferromagnetically coupling film in the above example, it is also possible to obtain the same effect even if more than two ferromagnetic layers and antiferromagnetically coupling films between these ferromagnetic layers are used.

Figure 5:
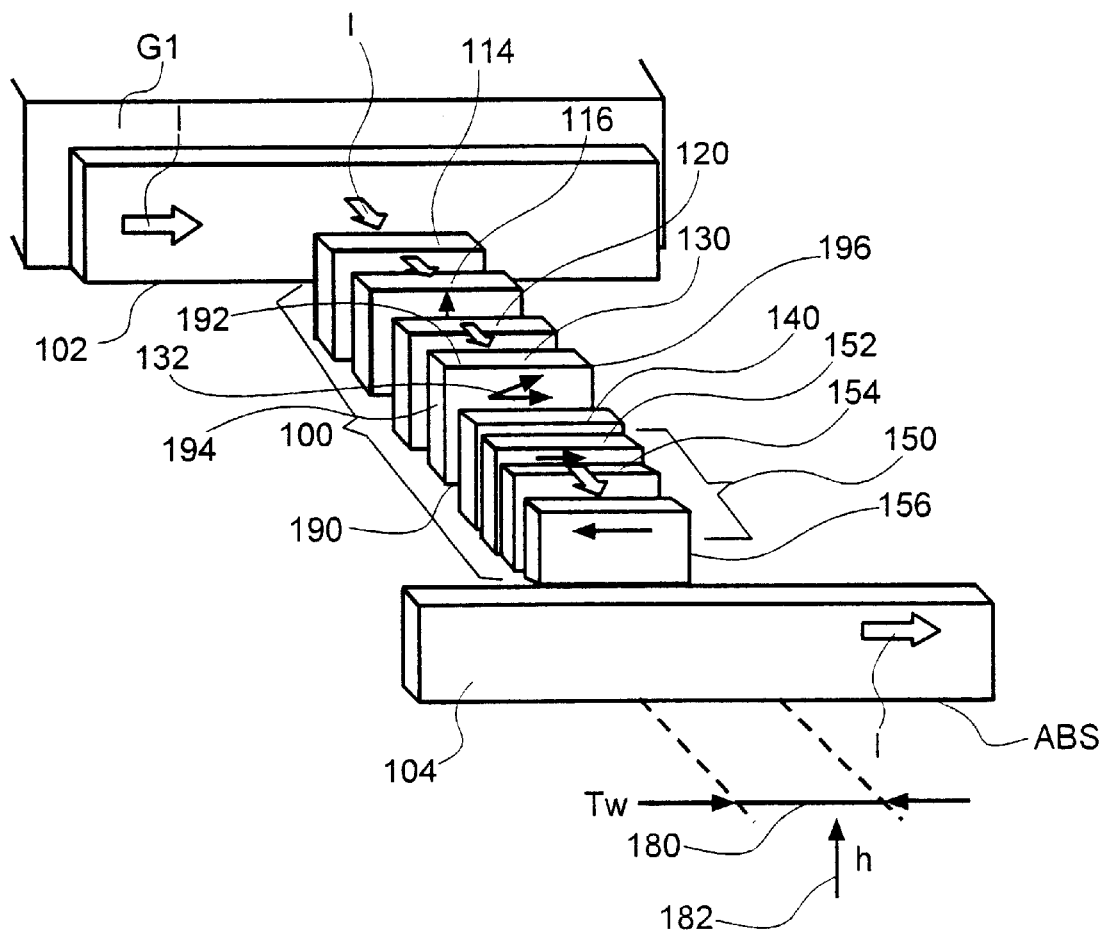
FIG. 5 is a perspective view of a magnetic tunnel junction MR read head according to the first preferred embodiment of the present invention.
Figure 6:
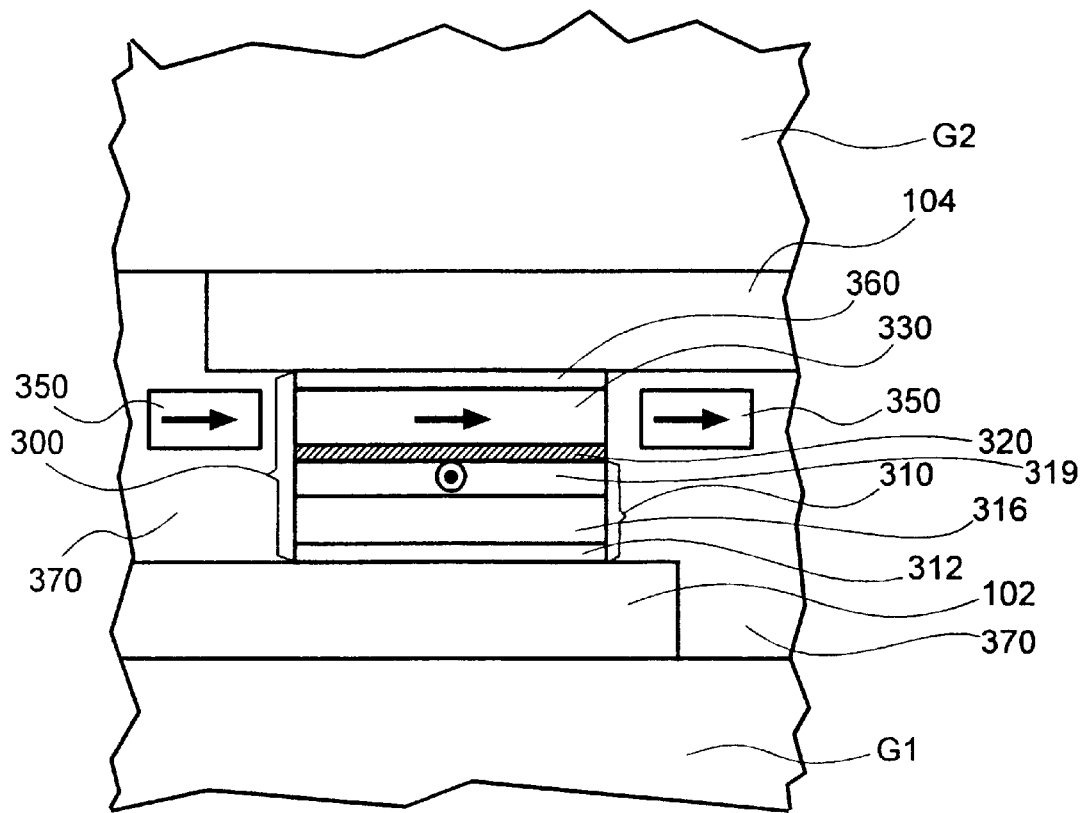
FIG. 6 is a sectional view of a magnetic tunnel junction MR read head according to a prior art.

FIG. 5 is an outline drawing of perspective view of a magnetic tunnel junction MR read head shown in FIG. 3, adjacent to the magnetic recording media of a magnetic disk drive, which shows a necessary part of Magnetic Tunneling Junction Stack 100 for the explanation purpose of the read head operation. It is drawn so that there is recorded data, generating a magnetic field h to the direction shown by an arrow 182, on a data track with track width Tw on the recording media. The pinned ferromagnetic layer 116 has its magnetic moment so as to cross the air-bearing surface (ABS) at right angles and as shown by an arrow which direction is in approximately parallel or in anti-parallel to the direction of the magnetic field h extended from the recording media. Even under the applied magnetic field h from recorded data, the magnetic moment of the pinned ferromagnetic layer is pinned by the interfacial exchange biasing field from the adjacent antiferromagnetically coupling layer 114. The free ferromagnetic layer 130 is shaped approximately rectangularity, which comprises a detection edge 190 on the air-bearing surface, a back edge 192 and two parallel side edges 194 and 196. As shown in the figure, the other layers of the Magnetic Tunneling Junction Stack 100 have plural edges adjacent to the edge of the layer 130. The free ferromagnetic layer 130, under no applied magnetic field, has the magnetic moment 132 in the parallel direction to the air-bearing surface. There is the nonmagnetic conductive layer 140 adjacent to the free ferromagnetic layer, and the domain controlling layer 150 adjacent to the nonmagnetic conductive layer 140. The nonmagnetic conductive layer 140 and the domain controlling layer 150 are shaped rectangularity as same as the free ferromagnetic layer. The domain controlling layer 150 comprises the ferromagnetic layer 152 adjacent to the nonmagnetic conductive layer 140, the antiferromagnetically coupling film 154 adjacent to the ferromagnetic layer 152 and the ferromagnetic layer 156 adjacent to the antiferromagnetically coupling film 154.

The magnetic moments, of different amount each other, of the ferromagnetic layers 152 and 156 are in parallel to the air-bearing surface and in anti-parallel to each other. Due to the difference of these magnetic moments, the magnetic pole remained on the side couples magneto-statically with the side surfaces 194 and 196 of the free ferromagnetic layer 130 so as to control the magnetic moment of the free ferromagnetic layer to be in parallel to the air-bearing surface, namely to be the direction of the solid arrow, under no magnetic field applied.

And RKKY interaction and Orange-Peel interaction induced through the nonmagnetic conductive layer 140 give the magnetic bias field to the free ferromagnetic layer to the direction of the arrow 132 so as to perform magnetic domain control of the magnetic moment of the free ferromagnetic layer to be in the direction of the arrow 132.

A detection current I is input to the lower electrode 102, is led straight to the antiferromagnetically coupling layer 114, the pinned ferromagnetic layer 116, the tunnel ferromagnetic layer 120, the free ferromagnetic layer 130 and to the domain controlling layer 150 (with some layers omitted) and gets out from the upper electrode 104. The tunneling current running through the insulating tunnel barrier layer 120 is the function of the relative angle between the magnetic moments of the pinned ferromagnetic layer 116 on the tunnel barrier layer 120 and the free ferromagnetic layer 130. The magnetic field h from the recorded data spins the direction of the magnetic moment of the free ferromagnetic layer 130 so as to offset it from the direction 132 as shown by the dotted arrow. According to this process above, the relative direction between the magnetic moments of the pinned ferromagnetic layer 116 and the free ferromagnetic layer 130 is changed to create resistance variation of the Magnetic Tunneling Junction Stack. The resistance variation is detected by the electronics of the magnetic disk drive to be handled as read back data.

Second Preferred Embodiment

The present embodiment is one of the variations of the preceding embodiment, which principle used is within the range of the preceding example.

Figure 4:
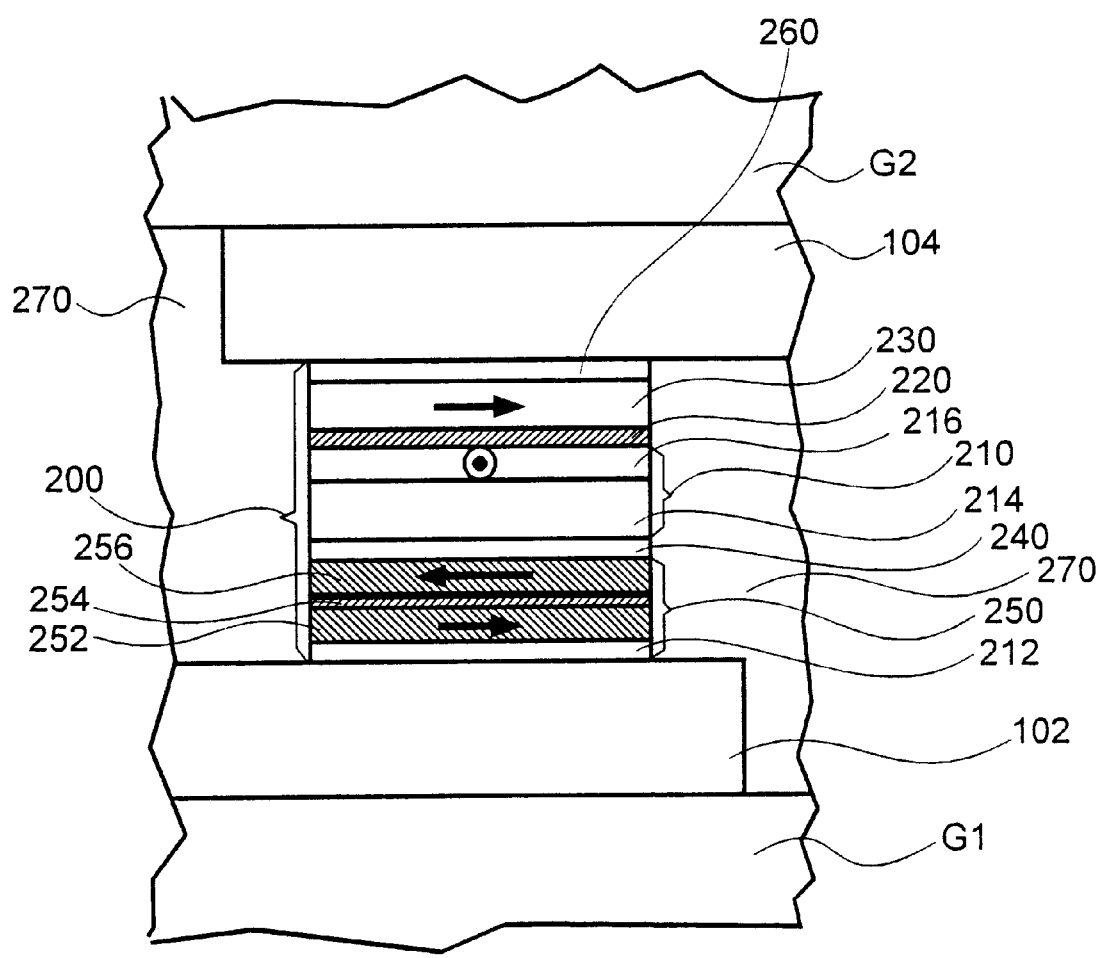
FIG. 4 is a sectional view of a magnetic tunnel junction MR read head according to the second preferred embodiment of the present invention.

The magnetic tunnel junction magneto-resistive read head shown in FIG. 4 has a Magnetic Tunneling Junction Stack unit 200 which is stacked and formed between a lower electrode 102 formed on a gap layer G1 substrate and an upper electrode 104 under a gap layer G2. The lower electrode 102 may be also used as first shield S1. The upper electrode 104 may be also used as second shield S2.

The Magnetic Tunneling Junction Stack 200 comprises a domain controlling layer 250, a nonmagnetic conductive layer 240, a pin layer 210, an insulating tunnel barrier layer 220 and a free ferromagnetic layer 230.

The domain controlling layer 250 formed on the lower electrode 102 comprises a seed layer 212 on the lower electrode 102, a ferromagnetic layer 252 on the seed layer, an antiferromagnetically coupling film 254 on the ferromagnetic layer 252 and a ferromagnetic layer 256 on the antiferromagnetically coupling film. There are the nonmagnetic conductive layer 240 formed on the domain controlling layer 250, and the pin layer 210 on the nonmagnetic conductive layer 240. The pin layer 210 comprises an antiferromagnetically coupling layer 214 and a pinned ferromagnetic layer 216 directly contacted on the antiferromagnetically coupling layer. The pinned ferromagnetic layer 216 is called as 'pinned ferromagnetic layer' since its magnetic moment is prevented from spinning under the magnetic field applied within the range of desired amount. The direction of the magnetic moment of this pinned ferromagnetic layer 216 is set to cross the air-bearing surface approximately at right angles, namely it crosses the plain of the paper at right angles as shown by the arrow head in FIG. 4. There are the insulating barrier layer 220 on the pinned ferromagnetic layer 216, and the free ferromagnetic layer 230 on the insulating tunnel barrier layer 220. There is a protective layer 260 on the free ferromagnetic layer. The protective layer prevents the Magnetic Tunneling Junction Stack 200 from being damaged during the manufacturing process. The free ferromagnetic layer 230 made of ferromagnetic material is not exchange biased with the antiferromagnetically coupling layer, and its magnetic moment is free to spin under the magnetic field within the range of desired amount. It is preferred that the magnetic moment of the free ferromagnetic layer is set to the direction (i.e., the arrowed direction in the layer 230 in FIG. 4) in parallel to the air-bearing surface (by referring FIG. 2) and to cross the direction of the magnetic moment of the pinned ferromagnetic layer 216 approximately at right angles under no applied magnetic field.

This stacked construction is formed as layers, by Sputtering method using argon gas for instance, in a same vacuum chamber to prevent each layer from being exposed to the atmosphere during a shift from one forming to another. An oxide layer is formed in the same chamber as well. There is no exposing to the atmosphere from the beginning to the end during the forming of the stacked construction.

A single layer of 1 to 7 nm thick Ta can be used for the seed layer 212, and the layer of Zr or Hf of the same thickness can be used as well. The seed layer controls crystallographic orientation of the domain controlling layer 250 formed on it, enlarges the antiferromagnetically coupling field between the ferromagnetic layers composing the domain controlling layer, additionally controls crystallographic orientation of the antiferromagnetically coupling layer 214 and the pinned ferromagnetic layer 216 formed on them, and keeps the magnetic stability of the pinned ferromagnetic layer 216.

The domain controlling layer 250 comprises the ferromagnetic layer 252, the antiferromagnetically coupling film 254 adjacent to the ferromagnetic layer 252 and the ferromagnetic layer 256 adjacent to the antiferromagnetically coupling film 254. The antiferromagnetically coupling film 254 works to couple the magnetic moments of the adjacent two ferromagnetic layers 252 and 256 in anti-parallel direction to each other in the same manner of first embodiment. The domain controlling layer 250 works to set the magnetic moment of the free ferromagnetic layer 230 in parallel to the air-bearing surface. That is, as shown by the arrows in 252 and 256 in FIG. 4, the magnetic moments are settled in anti-parallel to each other, and there is a difference of amount between the magnetic moments of the ferromagnetic layers 262 and 256 to remain a magnetic pole on the edge as a whole of the domain controlling layer 250. The magnetic pole induced on the edge of the magnetic domain control layer 250 generates the bias field on the free ferromagnetic layer 230 in parallel to the air-bearing surface, which bias field performs the magnetic domain control of the free ferromagnetic layer. The domain controlling force given to the free magnetic layer is obtained by making a difference of amount between the magnetic moments in anti-parallel to each other. For instance in case of using a same material, it can be adjusted by changing the difference of the thickness between both ferromagnetic layers 252 or 256 to each other.

As same as the preceding example, the material to compose the nonmagnetic conductive layer 240 can be Cu, Au, Ag or an alloy layer of these materials. In case of this composition, there is no domain controlling effect generated by such RKKY or Orange-Peel interaction as described in first embodiment since the nonmagnetic conductive layer and the free ferromagnetic layer are not directly touched each other. As to the ferromagnetic layers 252 and 256, it is preferred like the preceding example that the magnetic anisotropy field or the coercivity, as the characteristic of each single layer, is no less than 4000 A/m and the squareness ratio of Hysteresis curve is not less than 0.95. As the concrete material, an alloy layer of cobalt and iron (coercivity: 4000 A/m approx.), an alloy of cobalt, iron and vanadium (coercivity: 8000 to 16000 A/m) or an alloy of cobalt, nickel and copper (coercivity: 16000 to 48000 A/m) can be used. And the thickness of both ferromagnetic layers is preferred to be no more than 6 nm in common.

And as for the antiferromagnetically coupling film 254, Ru, Ir or Rh can be used. There creates antiferromagnetically coupling when the thickness is not more than 1.0 nm, and preferable thickness of the layer is between 0.5 and 1.0 nm.

While the domain controlling layer is composed by two ferromagnetic layers and a single antiferromagnetically coupling film in this example, it is also possible to obtain the same effect even if more than two ferromagnetic layers and antiferromagnetically coupling films between these ferromagnetic layers are used.

As for the antiferromagnetically coupling layer 214, as same as the preceding embodiment, an alloy layer of 7 to 20 nm thick PtMn, an alloy layer of 10 to 30 nm thick NiMn, PdMn or PdPtMn or an alloy layer of 5 to 13 nm IrMn can be used. However, it is preferred to use an alloy layer of 7 to 20 nm thick PtMn in terms of the thermal stability of the force to pin the pinned ferromagnetic layer and the electric conductivity life of the layer. As the pinned ferromagnetic layer 216, it can use a layer of 1 to 3 nm thick Co or an alloy layer of 1 to 3 nm thick CoFe. Or as the stacked construction layers, it can use the stacked layers of 1 to 5 nm thick Co, 0.6 to 1.0 nm thick Ru and 1 to 5 nm thick Co or the stacked layers of 1 to 5 nm thick CoFe, 0.6 to 1.0 nm thick Ru and 1 to 5 nm thick CoFe. In case of the stacked type of layers used for the pinned ferromagnetic layer, this thickness of the Ru layer is selected in order to force each magnetic moment of the adjacent two ferromagnetic layers to be set to opposite direction to each other. A magnetic pole of the edge part of the pinned ferromagnetic layer makes the magnetic moment of the free ferromagnetic layer tilt against the parallel direction to the air-bearing surface, that degrades symmetric characteristic of a read signal, so that the size of the magnetic pole on the edge part of the pinned ferromagnetic layer is preferred to be small as possible. Therefore, the pinned ferromagnetic layer is to be a stacked type of layers and each magnetic moment of two ferromagnetic layers is expected to be the same amount each other by adjusting its thickness. When a same material is used for the ferromagnetic layers of the stacked type layers, the difference of the thickness between both ferromagnetic layers is preferred no more than 5 nm.

The insulating tunnel barrier layer 1.40 is an aluminum oxide film, and its thickness is preferred to be 0.5 to 2 nm.

The forming method is that aluminum is deposited by using Sputtering method and oxidized within oxygen atmosphere or within oxygen radical in a separate unit of the same forming chamber.

The free ferromagnetic layer 230 uses a ferromagnetic material. As the free ferromagnetic layer, it can use layers of 0.5 to 2 nm thick CoFe and 1 to 7 nm thick NiFe, layers of 0.5 to 2 nm thick Co and 1 to 7 nm NiFe, or a layer of 1 to 3 nm thick CoNiFe by stacking in the order mentioned here onto the side of the insulating barrier layer 140. The reason here why Co or CoFe is attached onto the insulating barrier side is to make the resistance variation become large.

Third Preferred Embodiment

Figure 7:
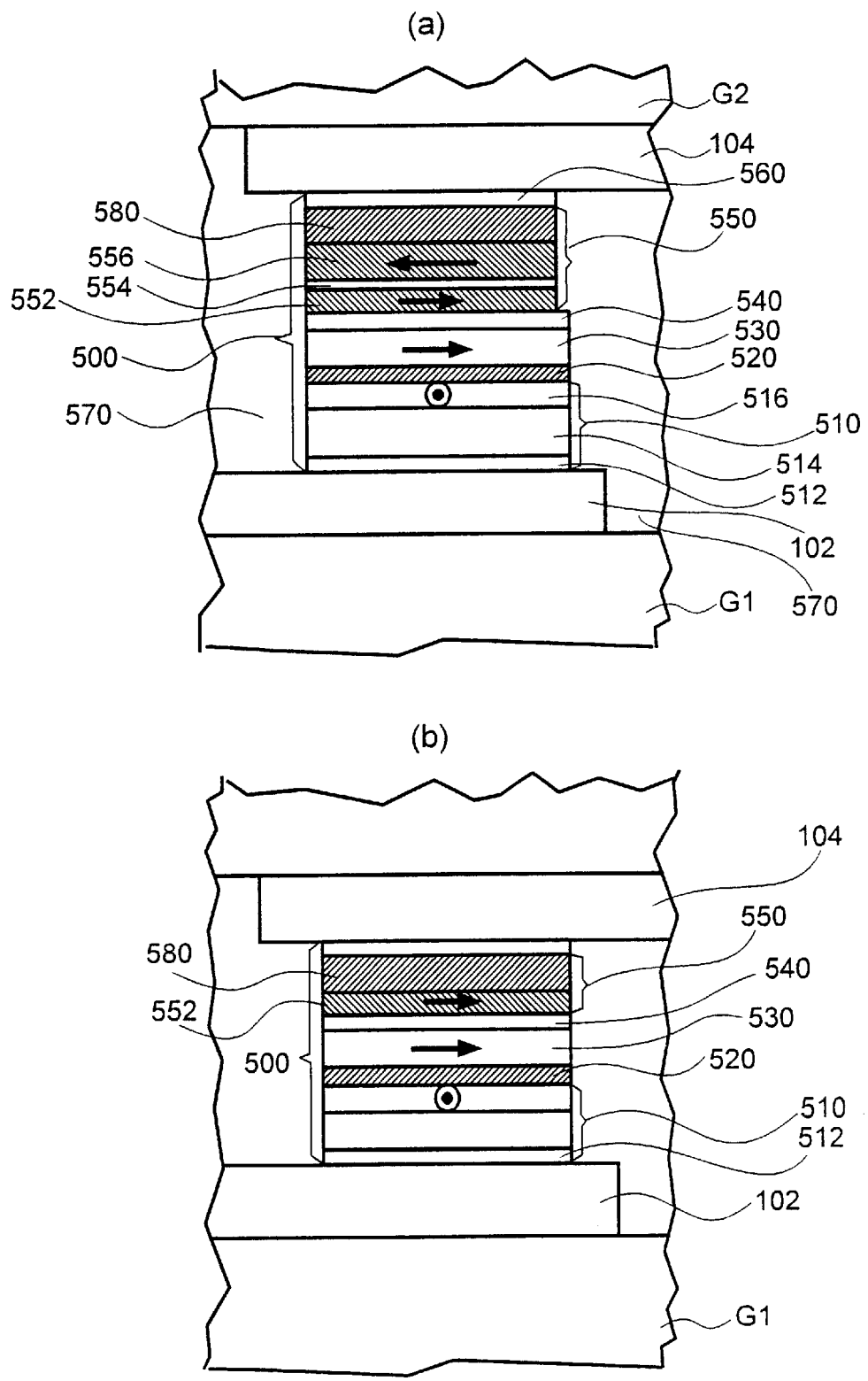
FIGS. 7(a) and 7(b) are sectional views of a magnetic tunnel junction MR read head according to the third preferred embodiment of the present invention.

The magnetic tunnel junction MR read head shown in FIGS. 7(a) and 7(b) have a Magnetic Tunneling Junction Stack unit 500 which is stacked and formed between a lower electrode 102 formed on a gap layer G1 substrate and an upper electrode 104 under a gap layer G2. The lower electrode 102 may be also used as first shield S1. The upper electrode 104 may be also used as second shield S2. The gap layers G1 and G2 are not necessary in this case. FIGS. 7(a) and 7(b) illustrate the view from the air-bearing surface.

The Magnetic Tunneling Junction Stack 500 comprises, as same as the first embodiment, a pin layer 510, an insulating tunnel barrier layer 520, a free ferromagnetic layer 530, a nonmagnetic conductive layer 540 and a domain controlling layer 550.

This Magnetic Tunneling Junction Stack 500 is formed as layers, in the same manner as the preceding embodiment, by Sputtering method using argon gas, in a same vacuum chamber to prevent each layer from being exposed to the atmosphere during a shift from one forming to another.

There is one of the preferred embodiments shown in FIG. 7(a). The same composition as the first preferred embodiment is applied to a seed layer 512, an antiferromagnetically coupling layer 514, a pinned ferromagnetic layer 516, the insulating tunnel barrier layer 520, the free ferromagnetic layer 530 and the nonmagnetic conductive layer 540.

It is a different point of the present embodiment from the first preferred embodiment that the antiferromagnetically coupling layer 580 is added to the domain controlling layer, and the ferromagnetic layer composing the domain controlling layer can use the same material as used by the pinned ferromagnetic layer or the free ferromagnetic layer.

In case of the first embodiment, (1) the anisotropy fields of two ferromagnetic layers 152 and 156 are reasonably large in order to prevent the magnetic moment of the domain controlling layer 150 from spinning under desired external magnetic field, and (2) a material of less magnetic dispersion is used not to prevent the magnetic spinning of the free ferromagnetic layer. For this purpose, it is necessary to use such a material as an alloy layer of cobalt and iron (coercivity: 4000 A/m approx.), an alloy layer of cobalt, iron and vanadium (coercivity: 8000 to 16000 A/m) or an alloy layer of cobalt, nickel and copper (coercivity: 16000 to 48000 A/m), which is a different material from the free ferromagnetic layer and the pinned ferromagnetic layer. On the other hand, in the present embodiment, the antiferromagnetically coupling layer 580 is additionally applied to give a magnetic bias field to the ferromagnetic layer 556 composing the domain controlling layer, so that the magnetic moment of the domain controlling layer is pinned. Therefore, the material used for the ferromagnetic layer can be the same material as the pinned ferromagnetic layer 516 or the free ferromagnetic layer 530. According to this construction, there is no magnetic pole on the surface of the domain controlling layer created, so that it is prevented from negative influence to the free ferromagnetic layer.

Each bias field of two antiferromagnetically coupling layers 514 and 580 given to the adjacent ferromagnetic layers is to be arranged to be in different direction each other. The bias field of 514 given to the pinned ferromagnetic layer is to be in the direction to cross the air-bearing surface at right angles, and the bias field of 580 given to the ferromagnetic layer 556 composing the domain controlling layer is to be in parallel direction to the air-bearing surface. In order to achieve this structure, the blocking temperature of two antiferromagnetically coupling layer 514 and 580 is to be different each other. Preferably, the blocking temperature of the antiferromagnetically coupling layer 514 adjacent to the pinned ferromagnetic layer is to be higher than the blocking temperature of the antiferromagnetically coupling layer 580 of the magnetic domain control layer. It is possible to use a material of an ordered alloy type layer of high blocking temperature such as an alloy of PtMn. NiMn, PdMn or PdPtMn for the antiferromagnetically coupling layer of 514. Preferable thickness of PtMn layer is 7 to 20 nm and preferable thickness of NiMn layer is 10 to 30 nm. The antiferromagnetically coupling layer using these materials realizes high blocking temperature not lower than 300 degree in Centigrade. On the contrary, for the antiferromagnetically coupling layer 580, a material of lower blocking temperature than the earlier materials is used, such as a disordered alloy of IrMn, FeMn, RhMn or RuMn. Preferable blocking temperature of the latter material is not higher than 200 degree in C. And in case, like CrMnPt alloy, that the blocking temperature is differed by the thickness even if the material is same, it is possible to use a same material for 514 and 580 when the earlier takes the thickness for high blocking temperature and the latter takes the thickness for low blocking temperature.

In order to arrange the bias fields given to two antiferromagnetically coupling layers in different directions each other, heat treatment is performed at least twice. The first heat treatment, which is to set the bias field of 514, is performed by applying a magnetic field to cross the air-bearing at right angles, with enough time and temperature so as to regulate the alloy and to give a stable bias field to the adjacent ferromagnetic layer, and then it is cooled down to the room temperature. The second heat treatment, which is to set the bias field of 580, is performed by applying a magnetic field to the direction in parallel to the air-bearing surface and to the direction to cross the direction of the magnetic field at the first heat treatment at right angles with lower temperature than the first. The temperature is enough temperature for 580 to give a stable bias field to the adjacent ferromagnetic layer and not to disarrange the bias field settled to 514 by the first heat treatment. In case that PtMn is used for 514 and IrMn is used for 580 for instance, the first heat treatment is performed at not lower than 240 degree C., and the second heat treatment is performed at not higher than 200 degree C., A variation of the present embodiment is shown in FIG. 7(b). In this example, a domain controlling layer is composed by single layer of a ferromagnetic layer 552 and an antiferromagnetically coupling layer 580.

In this case, the directions of (1) the magnetic bias field given to the free ferromagnetic layer by the magneto-static interaction of the magnetic pole on the edge of the ferromagnetic layer with the edge of the free ferromagnetic layer, and of (2) the bias field given to the ferromagnetic layer by RKKY interaction or Orange-Peel interaction of the ferromagnetic layer of the domain controlling layer side on the nonmagnetic conductive layer, are opposite and cancel each other, so that the combination of the layer thickness is to be selected properly so as to make a difference between both effects.

Fourth Preferred Embodiment

Figure 8:
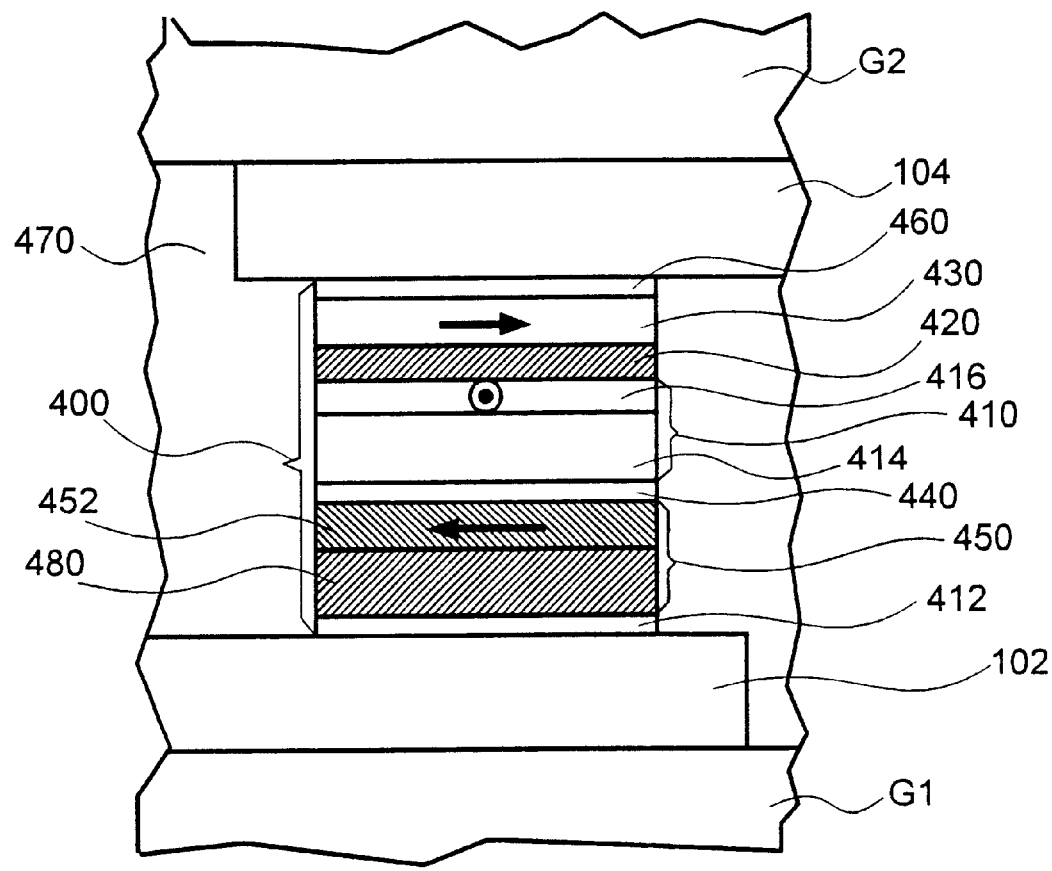
FIG. 8 is a sectional view of a magnetic tunnel junction MR read head according to the fourth preferred embodiment of the present invention.

The magnetic tunnel junction MR read head shown in FIG. 8 comprises Magnetic Tunneling Junction Stack 400 which is stacked and formed between a lower electrode 102 formed on a gap layer G1 and an upper electrode 104 under a gap layer G2. The lower electrode 102 may be also used as first shield S1. The upper electrode 104 may be also used as second shield S2. The gap layers G1 and G2 are not necessary in this case. The FIG. 8 is a drawing of the view from the air-bearing surface.

The Magnetic Tunneling Junction Stack 400 comprises, as same as the second embodiment, a domain controlling layer 450, a nonmagnetic conductive layer 440, a pin layer 410, an insulating tunnel barrier layer 420, a free ferromagnetic layer 430 and a protective layer 460. The same composition as the second preferred embodiment is applied to a seed layer 412, the nonmagnetic conductive layer 440, the pinned ferromagnetic layer 410, the insulating tunnel barrier layer 420, the free ferromagnetic layer 430 and the protective layer 460.

It is a different point of the present embodiment from the second preferred embodiment that the antiferromagnetically coupling layer 480 is added to the domain controlling layer, and the ferromagnetic layer composing the domain controlling layer can use the same material as used for the pinned ferromagnetic layer or the free ferromagnetic layer.

The present embodiment is the same as the third embodiment in terms of its possessing two antiferromagnetically coupling layers and its function. The bias field of 414 is given to the pinned ferromagnetic layer to the direction to cross the air-bearing surface at right angles, and the bias field of 480 is given to the ferromagnetic layer 456 composing the domain controlling layer to the direction in parallel to the air-bearing surface. In order to achieve this structure, the blocking temperature of two antiferromagnetically coupling layer 414 and 480 is to be different each other. Preferably, the blocking temperature of the antiferromagnetically coupling layer adjacent to the pinned ferromagnetic layer is to be higher than the blocking temperature of the domain controlling layer. The same material as 514 in the third embodiment can be used for the antiferromagnetically coupling layer of 414, and the same material as 580 in the third embodiment can be used for the antiferromagnetically coupling layer of 480.

In order to arrange the bias fields by two antiferromagnetically coupling layers in different directions each other, heat treatment needs to be performed at least twice, and the method is the same as the third embodiment.

Fifth Preferred Embodiment

The magnetic tunnel junction magneto-resistive head according to the present invention is possible to read the data, recorded on a recording media in high density, with high sensitivity, so that it is more effective when it is used as a read head for perpendicular recording suitable to high recording density.

Figure 9:
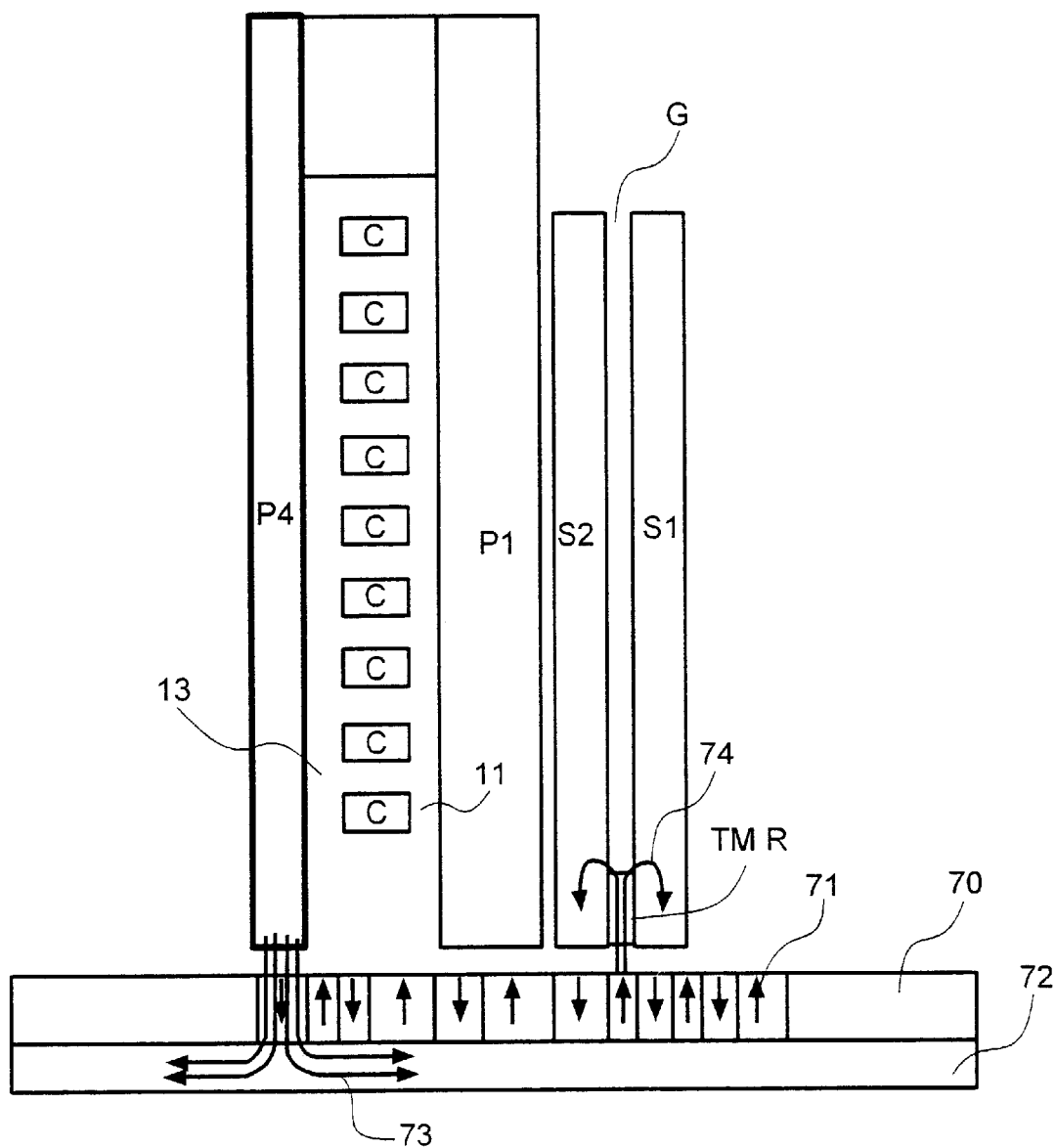
FIG. 9 is a drawing to show the relation to a recording media in case of the application to a perpendicular magnetic recording head as to the fifth preferred embodiment of the present invention.

FIG. 9 shows the structure of a perpendicular recording media and the magnetic tunnel junction magneto-resistive head according to the present invention. The head is finished by polish lapping to form an air-bearing surface (ABS), so that the ABS keeps a distance from the surface of the magnetic media 70 by the air-bearing effect. The read head has a Magnetic Tunneling Junction Stack, and the Magnetic Tunneling Junction Stack is placed between first shield layer S1 and second shield layer S2. For the Magnetic Tunneling Junction Stack, the Magnetic Tunneling Junction Stacks 100, 200, 300 or 400 exhibited by the embodiments from 1 through 4 is used. The recording head comprises a coil layer C and insulation layers I1 and I3, they lie between insulation layers I1 and I3, and the insulation layers I1 and I3 are also sandwiched between first magnetic pole piece P1 and the main edge pole piece P4. At recording, a signal current runs through the coil layer C and the recording flux 73 is generated on the air-bearing surface. The recording media is composed by a recording magnetization layer 70 and a soft magnetic layer 72. The recording flux 73 is set on the recording magnetization layer 70 in perpendicular to the media surface, so that magnetization 71 of the recording layer of the media is magnetized in perpendicular to the media surface. The magnetic flux which cane through the recording magnetization layer 70 goes through the soft magnetic layer 72 and returns to the magnetic pole P1. The cross sectional area of the magnetic pole P1 is extremely larger than the same of the magnetic pole P4, so that the magnetic flux density becomes so small that there is no influence to the magnetized condition of the recording media when the magnetic flux returns to P1. While reading, the recording magnetization 71 rotating gives magnetic flux 74 to the Magnetic Tunneling Junction Stack of the read head to cause resistance variation on the Magnetic Tunneling Junction Stack. This resistance variation is detected by detecting the voltage variation across the Magnetic Tunneling Junction Stack.

Figure 11:
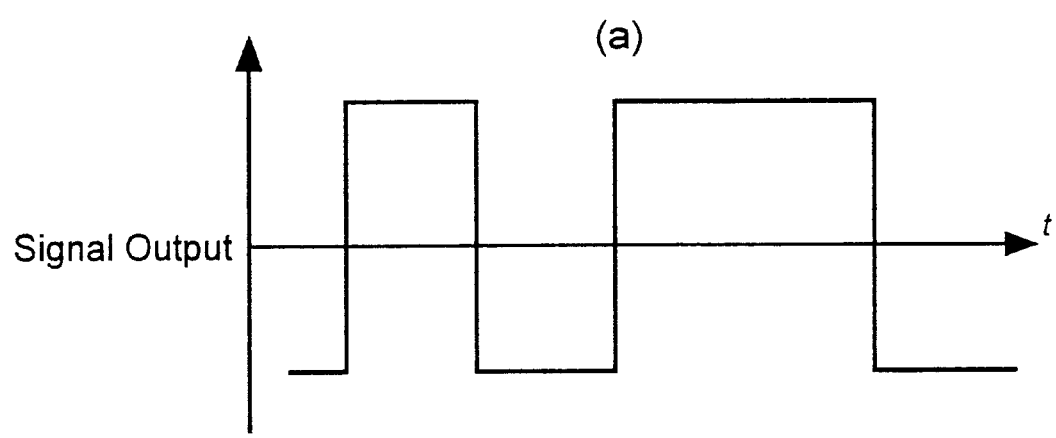
FIGS. 11(a) and 11(b) show a signal wave form at reading magnetically recorded information by perpendicular recording.
Figure 11:
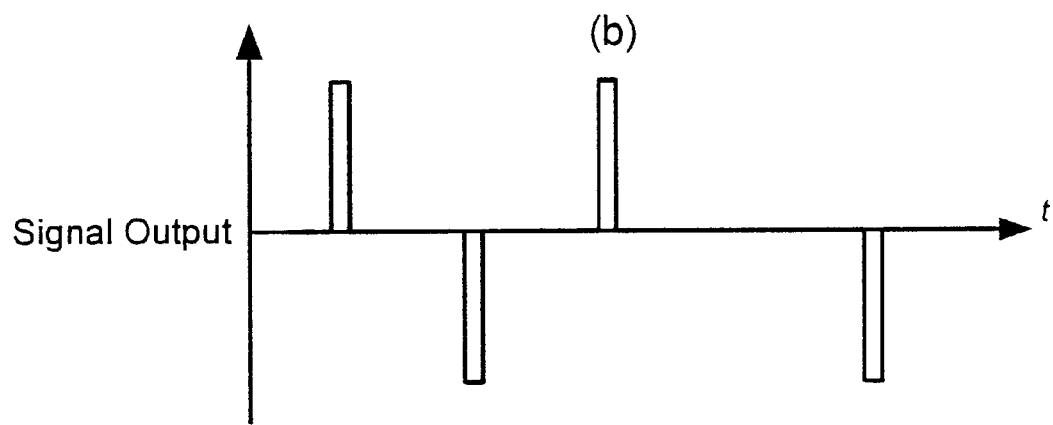

FIG. 11(a) shows the detection signal at reading the magnetization recorded by perpendicular recording. It is the waveform that the output is changed from positive value to negative or negative value to positive corresponding to the magnetic transitions, which is not possible to be handled by present signal processing architecture. Therefore, it is handled as a recorded information signal after converting the waveform in FIG. 11(a) to a differential form like waveform in FIG. 11(b) by an electronic processing of this signal or by contriving the structure of the magnetic head.

Sixth Preferred Embodiment

Figure 10:
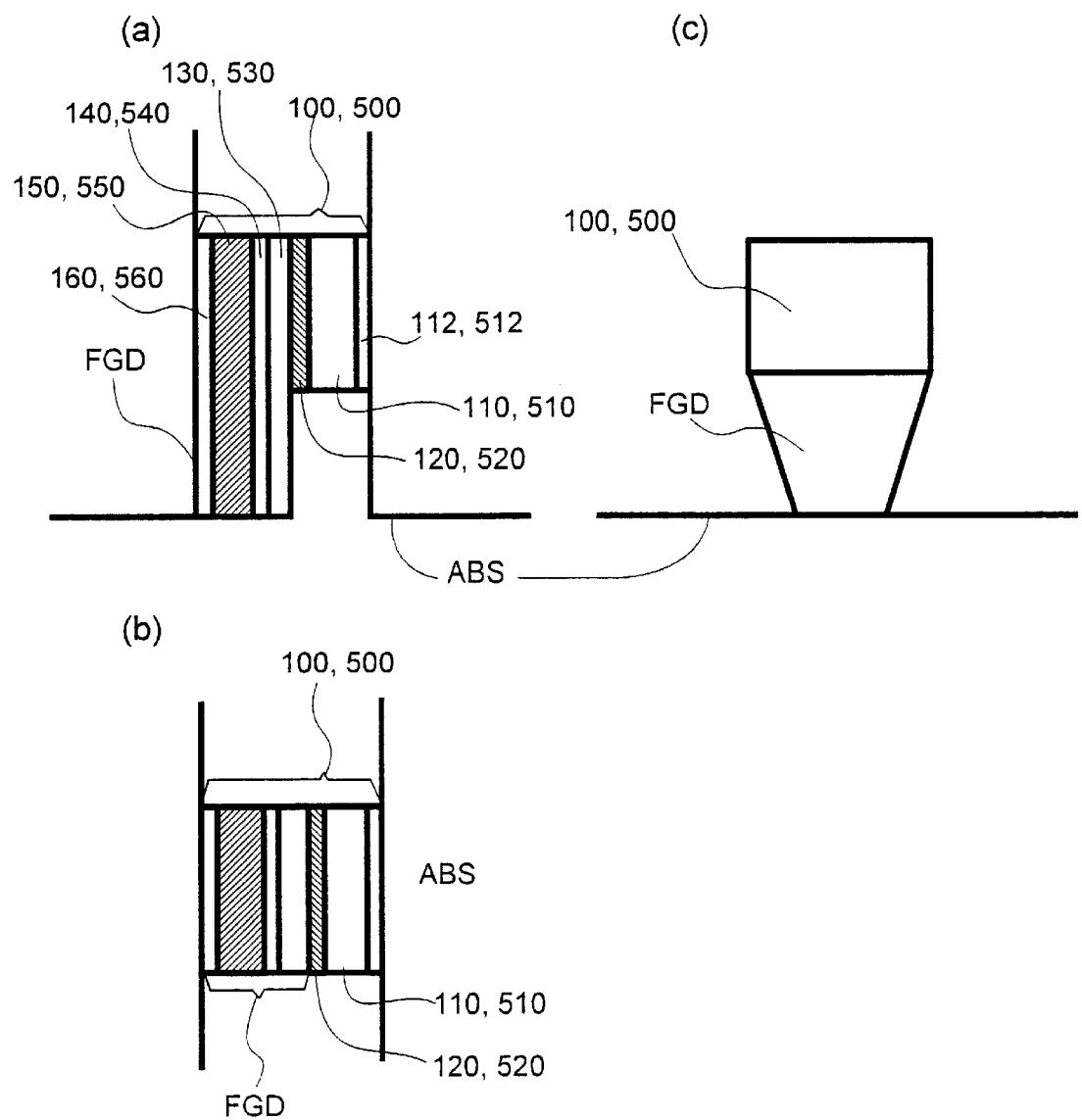
FIGS. 10(a), 10(b) and 10(c) illustrations of a Magnetic tunneling Junction Stack of flux guide type as to the sixth preferred embodiment of the present invention.

In the preceding examples, it is described on the assumption that the Magnetic Tunneling Junction Stack is exposed on the ABS surface, however, it is not always necessary to be exposed on the ABS surface. It may also put a flux guide of a soft magnetic material, by recessing from the ABS, to guide the magnetic flux from ABS surface into the Magnetic Tunneling Junction Stack. FIGS. 10(a), 10(b) and 10(c) show an example. The Magnetic Tunneling Junction Stack 100 or 500 is arranged to be recessed from the ABS surface, and a flux guide FGD is put between ABS and the Magnetic Tunneling Junction Stack. The flux guide is formed by a part of the Magnetic Tunneling Junction Stack. That is, it is composed by a free ferromagnetic layer 130(530), a non-magnetic conductive layer 140(540) and a domain controlling layer 150(550). There is no insulating tunnel barrier layer, pinned ferromagnetic layer and the adjacent first antiferromagnetically coupling layer within a flux guide part. Because of the domain controlling layer existing in the flux guide part, the flux guide receives domain controlling to be prevented from being a source of Barkhausen Noise. And a soft magnetic layer other than the free ferromagnetic layer can be also set as a flux guide. In the latter case, an efficiency to catch magnetic flux can also be improved by making the flux guide be thicker than the free ferromagnetic layer. It is preferred, in order to improve the catching efficiency of the flux guide, that the width is narrow on the air-bearing surface and is getting wider in accordance with the distance from the air-bearing surface as shown in FIG. 10(c).

When the flux guide is used, the sensor layer can be recessed from the ABS surface, so that it is possible to avoid the demerit from the damage of the sensor layer and the problem that the noise is increased due to the increase of the resistance of the element accompanied by the minute size when the sensor layer is exposed on the ABS surface.

According to the present invention, it is possible to present a magnetic tunnel junction magneto-resistive head with a stronger domain controlling force to the free ferromagnetic layer and with less characteristic degradation of the free ferromagnetic layer than the prior magnetic tunnel junction magneto-resistive head of Abutted junction type where a permanent magnet sandwiched by insulating layers is applied on each side of a Magnetic Tunneling Junction Stack.

In addition, the present invention is suitable for reading the magnetically recorded information in high density, so that it can be applied to a read head for perpendicular magnetic recording.

What is claimed:

1. A magneto-resistive head comprising:
   an antiferromagnetically coupling layer;
   a pinned ferromagnetic layer adjacent to said antiferromagnetically coupling layer,
   wherein said pinned layer is magnetically pinned by a magnetization of said antiferromagnetically coupling layer;
   a free ferromagnetic layer;
   a stack of ferromagnetic layers comprises plural ferromagnetic layers and at least one antiferromagnetically coupling layer which is sandwiched by said plural ferromagnetic layers; and
   a pair of electrodes to apply current to these said layers,
   wherein said stack of ferromagnetic layers is formed between said pair of electrodes,
   wherein said free ferromagnetic layer has a magnetic domain direction which is controlled by said stack of ferromagnetic layers, and
   wherein a magnetic field direction of said stack of ferromagnetic layers is almost parallel to said magnetic domain direction of said free ferromagnetic layer.

2. A magneto-resistive head according to claim 1,
   wherein said plural ferromagnetic layers composing said stack of ferromagnetic layers are made of cobalt, alloy of cobalt and iron as its main components, alloy of cobalt, iron and vanadium as its main components or alloy of cobalt, nickel and copper as its main components, and
   wherein said antiferromagnetically coupling layer is made of ruthenium, rhodium, iridium or alloy of these materials.

3. A magneto-resistive head according to claim 1,
   wherein said free ferromagnetic layer, sandwiched between said insulating layer and one of said electrodes, and the stack of layers containing a domain controlling layer are exposed on an air-bearing surface (ABS) to compose a flux guide.

4. A magneto-resistive head according to claim 1, further comprising:
   a second antiferromagnetically coupling layer adjacent to said stack of ferromagnetic layers.

5. A magneto-resistive head comprising:
   an antiferromagnetically coupling layer;
   a pinned ferromagnetic layer adjacent to said antiferromagnetically coupling layer, wherein said pinned layer is magnetically pinned by a magnetization of said antiferromagnetically coupling layer;
   a free ferromagnetic layer;
   a stack of ferromagnetic layers comprises plural ferromagnetic layers and at least one antiferromagnetically coupling layer which is sandwiched by said plural ferromagnetic layers; and
   a pair of electrodes to apply current to said layers,
   wherein said stack of ferromagnetic layers is formed between one of said pair of electrodes and said free ferromagnetic layer, and comprises two ferromagnetic layers, and
   wherein the thickness of one of said ferromagnetic layers closer to said one electrode side is almost equal to or greater than the thickness of another one of the ferromagnetic layers closer to said free ferromagnetic layer side.

6. A magnetic tunnel junction magneto-resistive head comprising:
   an antiferromagnetically coupling layer;
   a pinned ferromagnetic layer adjacent to said antiferromagnetically coupling layer, wherein said pinned layer is magnetically pinned by a magnetization of said antiferromagnetically coupling layer;
   a free ferromagnetic layer;
   insulating layers sandwiched by said pinned ferromagnetic layer and said free ferromagnetic layer;
   a domain controlling layer for controlling the magnetic domain of said free ferromagnetic layer;
   a nonmagnetic conductive layer formed between said domain controlling layer and said free ferromagnetic layer; and
   a pair of electrodes to apply a current to these layers,
   wherein said domain controlling layer comprises plural ferromagnetic layers and at least one antiferromagnetically coupling layer, which is sandwiched by said plural ferromagnetic layers, which is formed between said paid of electrodes,
   wherein said free ferromagnetic layer has a magnetic domain direction which is controlled by said domain controlling layer, and
   wherein a magnetic field direction of said domain controlling layer is almost parallel to said magnetic domain direction of said free ferromagnetic layer.

7. A magnetic tunnel junction magneto-resistive head according to claim 6, where the ferromagnetic layer of said domain controlling layer on the side of the free ferromagnetic layer gives biasing field to said free ferromagnetic layer through said nonmagnetic conductive layer.

8. A magnetic tunnel junction magneto-resistive head according to claim 6,
   wherein said nonmagnetic conductive layer adjacent to said free ferromagnetic layer and said domain controlling layer is composed by one of the materials of copper, gold or silver or by an alloy of at least one of these materials, and that the thickness is between 1.8 nm and 3.5 nm.

9. A magnetic tunnel junction magneto-resistive head according to claim 6, wherein plural ferromagnetic layers of said domain controlling layer are composed by cobalt, alloy of cobalt and iron as its main components, alloy of cobalt, iron and vanadium as its main components or alloy of cobalt, nickel and copper as its main components, and wherein said antiferromagnetically coupling layer is composed by ruthenium, rhodium, iridium or alloy of these materials.

10. A magnetic tunnel junction magneto-resistive head according to claim 6, wherein said free ferromagnetic layer, sandwiched between said insulating layer and one of said electrodes, and the layers containing a domain controlling layer are exposed on an air-bearing surface (ABS) to compose a flux guide.

11. A magnetic tunnel junction magneto-resistive head comprising:

a substrate;

a lower electrode formed on said substrate;

an antiferromagnetically coupling layer formed on said lower electrode;

a pinned ferromagnetic layer formed adjacent to said antiferromagnetically coupling layer;

an insulating tunnel barrier layer formed adjacent to said pinned ferromagnetic layer;

a free ferromagnetic layer formed adjacent to said insulating tunnel barrier layer;

a nonmagnetic conductive layer formed adjacent to said free ferromagnetic layer;

a domain controlling layer formed adjacent to said nonmagnetic conductive layer; and an upper electrode formed on said domain controlling layer, wherein said domain controlling layer comprises plural ferromagnetic layers and at least one antiferromagnetically coupling layer which is sandwiched by said plural ferromagnetic layers, wherein said free ferromagnetic layer has a magnetic domain direction which is controlled by said domain controlling layer, and wherein a magnetic field direction of said domain controlling layer is almost parallel to said magnetic domain direction of said free ferromagnetic layer.

12. A magnetic tunnel junction magneto-resistive head comprising:

a substrate;

a lower electrode formed on said substrate;

an antiferromagnetically coupling layer formed on said lower electrode;

a pinned ferromagnetic layer formed adjacent to said antiferromagnetically coupling layer;

an insulating tunnel barrier layer formed adjacent to said pinned ferromagnetic layer;

a free ferromagnetic layer formed adjacent to said insulating tunnel barrier layer;

a nonmagnetic conductive layer formed adjacent to said free ferromagnetic layer;

a domain controlling layer formed on said nonmagnetic conductive layer; and an upper electrode formed on said domain controlling layer, wherein said domain controlling layer comprises two ferromagnetic layers using a same material, the difference of the thickness between both ferromagnetic layers is not more than 5 nm, and said antiferromagnetically coupling layer is an alloy layer of 7 to 20 nm PtMn.

13. A magnetic tunnel junction magneto-resistive head comprising:

a substrate;

a lower electrode formed on said substrate;

a domain controlling layer formed on said lower electrode;

a nonmagnetic conductive layer formed adjacent to said magnetic domain control layer;

an antiferromagnetically coupling layer formed adjacent to said nonmagnetic conductive layer;

a pinned ferromagnetic layer formed adjacent to said antiferromagnetically coupling layer;

an insulating tunnel barrier layer formed adjacent to said pinned ferromagnetic layer;

a free ferromagnetic layer formed adjacent to said insulating tunnel barrier layer; and an upper electrode formed on said free ferromagnetic layer, wherein said domain controlling layer comprises plural ferromagnetic layers and at least one antiferromagnetically coupling layer which is sandwiched by said plural ferromagnetic layers, wherein said free ferromagnetic layer has a magnetic domain direction which is controlled by said domain controlling layer, and wherein a magnetic field direction of said domain controlling layer is almost parallel to said magnetic domain direction of said free ferromagnetic layer.

14. A magnetic tunnel junction magneto-resistive head comprising:

a substrate;

a lower electrode formed on said substrate;

a domain controlling layer formed on said lower electrode;

a nonmagnetic conductive layer formed adjacent to said domain controlling layer;

an antiferromagnetically coupling layer formed adjacent to said nonmagnetic conductive layer;

a pinned ferromagnetic layer formed adjacent to said antiferromagnetically coupling layer;

an insulating tunnel barrier layer formed adjacent to said pinned ferromagnetic layer;

a free ferromagnetic layer formed adjacent to said insulating tunnel barrier layer; and an upper electrode formed on said free ferromagnetic layer, wherein said domain controlling layer comprises two ferromagnetic layers using the same material, the difference of the thickness between both ferromagnetic layers is not more than 5 nm, and said antiferromagnetically coupling layer is an alloy layer of 7 to 20 nm PtMn.

15. A magnetic tunnel junction magneto-resistive head comprising:

a substrate;

a lower electrode formed on said substrate;

first antiferromagnetically coupling layer formed on said lower electrode;

a pinned ferromagnetic layer formed adjacent to said antiferromagnetically coupling layer;

an insulating tunnel barrier layer formed adjacent to said pinned ferromagnetic layer;

a free ferromagnetic layer formed adjacent to said insulating tunnel barrier layer;

a nonmagnetic conductive layer formed adjacent to said free ferromagnetic layer;

a domain controlling layer formed adjacent to said nonmagnetic conductive layer; and an upper electrode formed on said domain controlling layer, wherein said domain controlling layer comprises plural ferromagnetic layers, at least one antiferromagnetically coupling layer which is sandwiched by said plural ferromagnetic layers, and second antiferromagnetically coupling layer adjacent to one of said plural ferromagnetic layers, wherein said free ferromagnetic layer has a magnetic domain direction which is controlled by said domain controlling layer, and wherein a magnetic field direction of said domain controlling layer is almost parallel to said magnetic domain direction of said free ferromagnetic layer.

16. A magnetic tunnel junction magneto-resistive head according to claim 15, wherein said plural ferromagnetic layers of said domain controlling layer are made of cobalt, alloy of cobalt and iron as its main components or alloy of nickel and iron as its main components, and wherein said antiferromagnetically coupling layer is made of ruthenium, rhodium, iridium or alloy of these materials.

17. A magnetic tunnel junction magneto-resistive head according to claim 15, wherein said first antiferromagnetically coupling layer is made of an antiferromagnetic material of ordered alloy type containing Mn, and wherein said second antiferromagnetically coupling layer is made of an antiferromagnetic material of disordered alloy type containing Mn.

18. A magnetic tunnel junction magneto-resistive head according to claim 15, wherein said first antiferromagnetically coupling layer is composed by one of the materials selected from the group of PtMn alloy, NiMn alloy, PdMn alloy, PdPtMn alloy and CrMnPt alloy, and wherein said second antiferromagnetically coupling layer is composed by one of the materials selected from the group of IrMn alloy, FeMn alloy, RhRuMn alloy, RhMn alloy and CrMnPt alloy.

19. A magnetic tunnel junction magneto-resistive head according to claim 15, wherein said ferromagnetic layer of said domain controlling layer on the side of the free ferromagnetic layer gives biasing field to said free ferromagnetic layer through said nonmagnetic conductive layer.

20. A magnetic tunnel junction magneto-resistive head according to claim 15, wherein said nonmagnetic conductive layer adjacent to said free ferromagnetic layer and said domain controlling layer is composed by one of the materials of copper, gold or silver or by an alloy containing at least one of these materials, and that the thickness is between 1.8 nm and 3.5 nm.

21. A magnetic tunnel junction magneto-resistive head according to claim 15, featuring that said free ferromagnetic layer, sandwiched between said insulating layer and one of said electrodes, and the layers containing a domain controlling layer are exposed on the air-bearing surface (ABS) to compose a flux guide.

22. A magnetic tunnel junction magneto-resistive head comprising:

a substrate;

a lower electrode formed on said substrate;

first antiferromagnetically coupling layer formed on said lower electrode;

a pinned ferromagnetic layer formed adjacent to said first antiferromagnetically coupling layer;

an insulating tunnel barrier layer formed adjacent to said pinned ferromagnetic layer;

a free ferromagnetic layer formed adjacent to said insulating tunnel barrier layer;

a nonmagnetic conductive layer formed adjacent to said free ferromagnetic layer;

a domain controlling layer formed adjacent to said nonmagnetic conductive layer; and an upper electrode formed on said domain controlling layer, wherein said domain controlling layer comprises plural ferromagnetic layers, at least one antiferromagnetically coupling layer which is sandwiched by said plural ferromagnetic layers, and second antiferromagnetically coupling layer adjacent to one of said plural ferromagnetic layers, wherein the thickness of one of said two ferromagnetic layers on the side of said upper electrode is equal to or thicker than the thickness of the other ferromagnetic layer on the side of said free ferromagnetic layer.

23. A magnetic tunnel junction magneto-resistive head comprising:

an antiferromagnetically coupling layer;

a pinned ferromagnetic layer adjacent to said antiferromagnetically coupling layer, wherein said pinned layer is magnetically pinned by a magnetization of said antiferromagnetically coupling layer;

a free ferromagnetic layer;

insulating layers sandwiched by said pinned ferromagnetic layer and said free ferromagnetic layer;

a domain controlling layer for controlling the magnetic domain of said free ferromagnetic layer;

a nonmagnetic conductive layer formed between said domain controlling layer and said free ferromagnetic layer; and a pair of electrodes to apply current to these layers, wherein said domain controlling layer comprises plural ferromagnetic layers and at least one antiferromagnetically coupling layer which is sandwiched by said plural ferromagnetic layers, which is formed between said pair of electrodes, and wherein the thickness of one of said plural ferromagnetic layers closer to one of said electrodes is almost equal to or thicker than another ferromagnetic layer closer to said free ferromagnetic layer side.

24. A magnetic tunnel junction magneto-resistive head comprising:

a substrate;

a lower electrode formed on said substrate;

an antiferromagnetically coupling layer formed on said lower electrode;

a pinned ferromagnetic layer formed adjacent to said antiferromagnetically coupling layer;

an insulating tunnel barrier layer formed adjacent to said pinned ferromagnetic layer;

a free ferromagnetic layer formed adjacent to said insulating tunnel barrier layer;

a nonmagnetic conductive layer formed adjacent to said free ferromagnetic layer;

a domain controlling layer formed adjacent to said nonmagnetic conductive layer; and an upper electrode formed on said domain controlling layer, wherein said domain controlling layer comprises plural ferromagnetic layers and at least one antiferromagnetically coupling layer which is sandwiched by said plural ferromagnetic layers, and wherein the thickness of one of said plural ferromagnetic layers closer to said upper electrode is almost equal to or thicker than another ferromagnetic layer closer to said free ferromagnetic layer side.

* * * * *